United States Patent
Kiyokawa

(10) Patent No.: US 10,155,540 B2
(45) Date of Patent: Dec. 18, 2018

(54) PARKING ASSISTANCE DEVICE

(71) Applicant: AISIN SEIKI KABUSHIKI KAISHA, Kariya-shi, Aichi-ken (JP)

(72) Inventor: Yusuke Kiyokawa, Nagoya (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 150 days.

(21) Appl. No.: 15/223,264

(22) Filed: Jul. 29, 2016

(65) Prior Publication Data

US 2017/0029028 A1    Feb. 2, 2017

(30) Foreign Application Priority Data

Jul. 31, 2015  (JP) .................................. 2015-152793

(51) Int. Cl.
  *B62D 15/02*  (2006.01)
  *G08G 1/16*  (2006.01)

(52) U.S. Cl.
  CPC ......... *B62D 15/0285* (2013.01); *G08G 1/165* (2013.01); *G08G 1/168* (2013.01)

(58) Field of Classification Search
  CPC .... B62D 15/0285; G08G 1/165; G08G 1/168; B60W 30/06
  USPC .......................................... 701/41, 300, 301
  See application file for complete search history.

(56) References Cited

U.S. PATENT DOCUMENTS

| | | | |
|---|---|---|---|
| 7,739,046 B2 | 6/2010 | Satonaka et al. | |
| 8,457,868 B2 * | 6/2013 | Tange | B60W 30/12 701/116 |
| 8,630,793 B2 * | 1/2014 | Takemura | B60W 30/12 701/1 |
| 9,174,672 B2 * | 11/2015 | Zeng | G05D 1/024 |
| 9,199,668 B2 * | 12/2015 | Zeng | B62D 15/0265 |
| 9,262,923 B2 * | 2/2016 | Chang | G01S 13/86 |
| 9,457,806 B2 * | 10/2016 | Hayakawa | B60W 50/12 |
| 9,604,638 B2 * | 3/2017 | Kiyokawa | B60W 30/06 |
| 9,836,658 B2 * | 12/2017 | Kiyokawa | G06K 9/00798 |
| 10,055,994 B2 * | 8/2018 | Tomozawa | G08G 1/168 |

(Continued)

FOREIGN PATENT DOCUMENTS

| | | |
|---|---|---|
| DE | 10 2010 020 204 A1 | 11/2011 |
| JP | 2006-193014 A | 7/2006 |
| JP | 2015-81022 A | 4/2015 |

OTHER PUBLICATIONS

Communication dated Feb. 8, 2017 from the European Patent Office in counterpart European application No. 16181851.3.

*Primary Examiner* — Angelina Shudy
(74) *Attorney, Agent, or Firm* — Sughrue Mion, PLLC

(57) ABSTRACT

A parking assistance device includes: an obstacle detection unit detecting an obstacle; a target determination unit determining a target area; a route determination unit determining a route from a position of a vehicle to the target area when assisting a driver in parking the vehicle in the target area; and a movement control unit assisting the driver by detecting the position and an inclination angle of the vehicle and controlling the vehicle, terminating the assist when the position is within a first range, the inclination angle is within a second range, and the position is within a third range, and terminating the assist when, while the vehicle travels, the position is within the first range, the inclination angle is within the second range, the position is outside of the third range, and the approach of an obstacle is detected.

7 Claims, 14 Drawing Sheets

(56) References Cited

U.S. PATENT DOCUMENTS

| | | | | |
|---|---|---|---|---|
| 2003/0004617 | A1* | 1/2003 | Kimura | B60T 8/172 701/1 |
| 2003/0109980 | A1* | 6/2003 | Kojima | B60K 31/0058 701/96 |
| 2006/0111842 | A1* | 5/2006 | Sugimoto | G08G 1/166 701/301 |
| 2006/0136132 | A1* | 6/2006 | Sawamoto | B60W 30/16 701/301 |
| 2008/0009990 | A1* | 1/2008 | Katoh | B62D 15/0285 701/36 |
| 2008/0154464 | A1* | 6/2008 | Sasajima | B62D 15/0285 701/42 |
| 2010/0235035 | A1* | 9/2010 | Nishira | B60T 7/22 701/31.4 |
| 2013/0096816 | A1* | 4/2013 | Takano | B62D 15/0265 701/400 |
| 2013/0116879 | A1 | 5/2013 | Hüger et al. | |
| 2014/0249718 | A1* | 9/2014 | Liu | G08G 1/16 701/41 |
| 2014/0350838 | A1* | 11/2014 | Hayashi | G01S 13/931 701/301 |
| 2015/0120138 | A1* | 4/2015 | Zeng | B62D 15/0265 701/41 |
| 2015/0251693 | A1* | 9/2015 | Lavoie | B62D 13/06 701/41 |
| 2015/0291031 | A1* | 10/2015 | Morimoto | B60W 50/12 701/70 |
| 2016/0107690 | A1* | 4/2016 | Oyama | B62D 15/0285 701/41 |
| 2016/0203377 | A1* | 7/2016 | Irie | G08G 1/168 348/118 |
| 2016/0272244 | A1 | 9/2016 | Imai et al. | |
| 2016/0335892 | A1* | 11/2016 | Okada | B60T 7/22 |
| 2017/0028914 | A1* | 2/2017 | Kiyokawa | B62D 15/028 |
| 2017/0028984 | A1* | 2/2017 | Kiyokawa | B62D 15/027 |
| 2017/0028985 | A1* | 2/2017 | Kiyokawa | B62D 15/0285 |
| 2017/0032679 | A1* | 2/2017 | Tomozawa | G08G 1/168 |
| 2017/0032680 | A1* | 2/2017 | Imai | G08G 1/168 |
| 2017/0105208 | A1* | 4/2017 | Hedayat | H04W 72/048 |
| 2017/0158225 | A1* | 6/2017 | Brown | B62D 5/0457 |
| 2017/0160745 | A1* | 6/2017 | Lauffer | G01S 13/931 |
| 2017/0259812 | A1* | 9/2017 | Tomozawa | B60W 30/06 |
| 2017/0259850 | A1* | 9/2017 | Yamashita | B62D 6/00 |

* cited by examiner

PARKING ASSISTANCE DEVICE

CROSS REFERENCE TO RELATED APPLICATIONS

This application is based on and claims priority under 35 U.S.C. § 119 to Japanese Patent Application 2015-152793, filed on Jul. 31, 2015, the entire contents of which are incorporated herein by reference.

TECHNICAL FIELD

An embodiment of this disclosure relates to a parking assistance device.

BACKGROUND DISCUSSION

A parking assistance device may be mounted on a vehicle to assist a driver in parking the vehicle. The parking assistance device detects obstacles such as other stopped vehicles, and determines a route along which the vehicle is capable of avoiding the obstacles and reaching a target parking position. The parking assistance device assists the driver in parking the vehicle based on the route.

An example of related art includes JP 2006-193014A (Reference 1).

The parking assistance device detects obstacles via various sensors. The sensors may not be able to detect the position of an obstacle in advance depending on the position, size, and shape of the obstacle. If the vehicle moves along a route determined by the parking assistance device in this state, there is a possibility that the vehicle approaches the obstacle.

SUMMARY

A parking assistance device according to an aspect of this disclosure includes: an obstacle detection unit; a target determination unit; a route determination unit; and a movement control unit. The obstacle detection unit detects an obstacle. The target determination unit determines a target area. The route determination unit determines a route from a position of a vehicle to the target area when assisting a driver in parking the vehicle in the target area. The movement control unit assists the driver in parking the vehicle in the target area by detecting the position and an inclination angle of the vehicle and controlling the vehicle, terminates the assist in a case where the position of the vehicle in a rightward and leftward direction of the target area is within a first range, the inclination angle of the vehicle relative to the target area is within a second range, and the position of the vehicle in a forward and rearward direction of the target area is within a third range, and also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, and the obstacle detection unit has detected the approach of an obstacle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment will be disclosed. The configuration of the embodiment described hereinafter and actions, results, and effects brought by the configuration are merely examples. This disclosure can also be realized by a configuration other than the configuration disclosed in the embodiment described hereinafter. At least one of various effects and derivative effects based on the basic configuration can be obtained.

For example, a vehicle 1 in the embodiment may be a vehicle equipped with an internal combustion engine (not illustrated) as a drive source, that is, may be an internal combustion engine vehicle. The vehicle 1 may be a vehicle equipped with an electric motor (not illustrated) as a drive source, that is, may be an electric vehicle, a fuel cell vehicle, or the like. The vehicle 1 may be a hybrid vehicle equipped with both an internal combustion engine and an electric motor as drive sources. Alternatively, the vehicle 1 may be a vehicle equipped with another drive source. Various transmissions can be mounted on the vehicle 1. Various devices such as systems or components required to drive an internal combustion engine or an electric motor can be mounted on the vehicle 1. The type, number, and layout of devices relating to driving vehicle wheels 3 of the vehicle 1 can be set in various forms.

Figure 1:
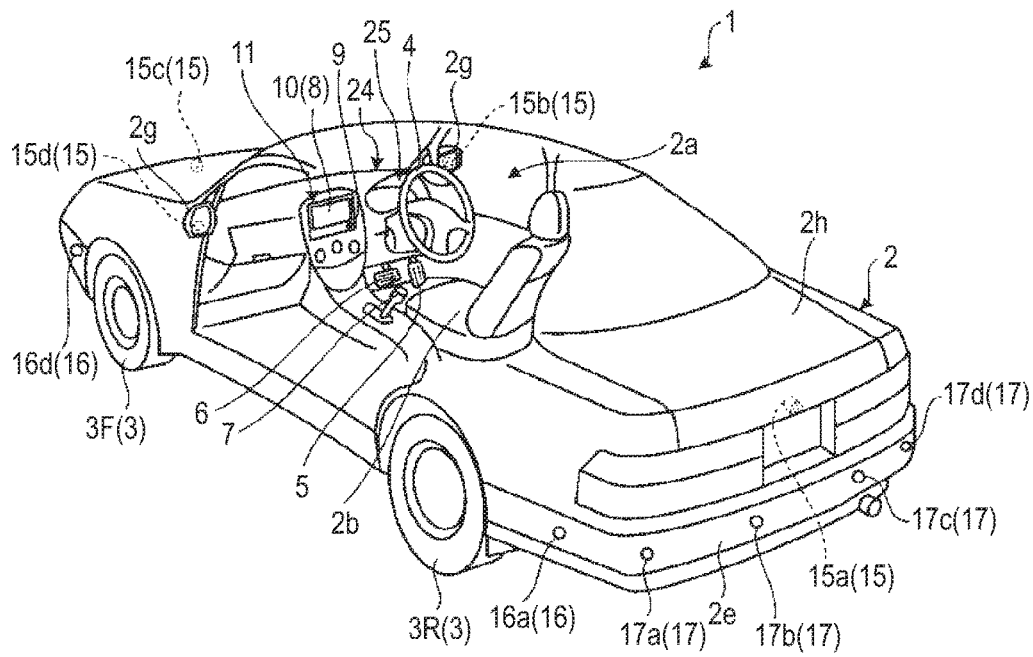
FIG. 1 is an exemplary perspective view in which a portion of a passenger compartment of a vehicle in an embodiment is seen in perspective.
Figure 2:
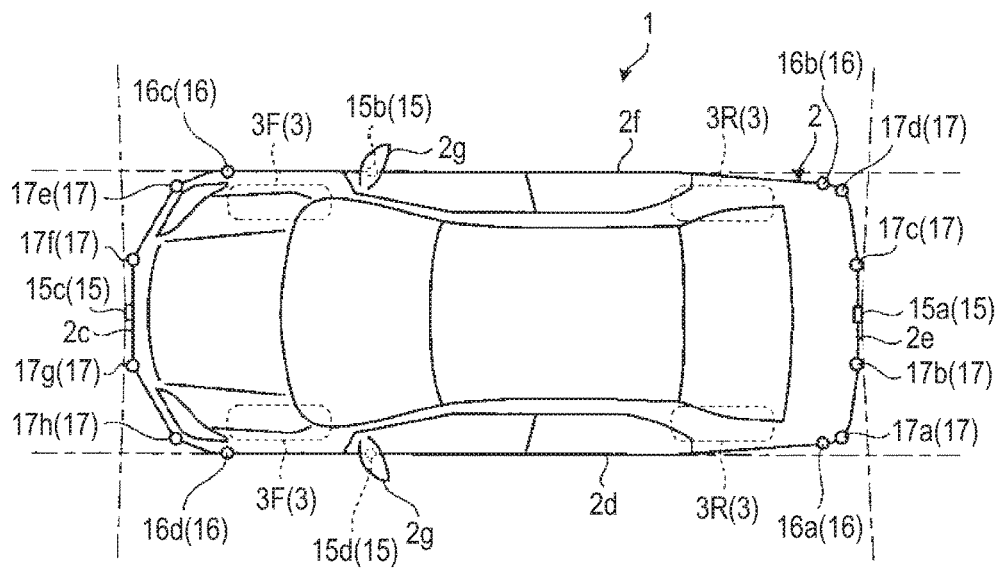
FIG. 2 is an exemplary plan view (bird's-eye view) of the vehicle in the embodiment.

FIG. 1 is an exemplary perspective view in which a portion of a passenger compartment 2a of the vehicle 1 in the embodiment is seen in perspective. FIG. 2 is an exemplary plan view (bird's-eye view) of the vehicle 1 in the embodiment. As illustrated in FIG. 1, a vehicle body 2 forms the passenger compartment 2a in which occupants (not illustrated) are seated. A steering section 4, an acceleration operation section 5, a brake operation section 6, a shift operation section 7, and the like are provided inside the passenger compartment 2a in a state where these sections are disposed in the vicinity of a seat 2b of a driver who is an occupant.

For example, the steering section 4 is a steering wheel that protrudes from a dashboard 24. The acceleration operation section 5 is an accelerator pedal positioned under the feet of the driver. The brake operation section 6 is a brake pedal positioned under the feet of the driver. The shift operation section 7 is a shift lever that protrudes from a center console. The steering section 4, the acceleration operation section 5, the brake operation section 6, and the shift operation section 7 are not limited to those components described above.

In addition, a display device 8 which is a display output unit and a voice output device 9 which is a voice output unit are provided inside the passenger compartment 2a. The display device 8 is a liquid crystal display (LCD), an organic electroluminescence display (OELD), or the like. The voice output device 9 is a speaker or the like. The display device 8 is covered with a transparent operation input unit 10 such as a touch panel.

An occupant can observe an image displayed on a display screen of the display device 8 via the operation input unit 10. An occupant can execute an input operation by touching, pressing or moving a portion of the operation input unit 10, which is positioned to correspond to an image displayed on the display screen of the display device 8, with a finger. The display device 8, the voice output device 9, the operation input unit 10, and the like are provided in a monitor device 11 that is positioned in a central portion of the dashboard 24 in a lateral direction of the vehicle, that is, a rightward and leftward direction.

The monitor device 11 may include operation input units (not illustrated) such as switches, dials, joysticks, and pressable buttons. A voice output device (not illustrated) may be provided inside the passenger compartment 2a at a position different from the position of the monitor device 11. The voice output device 9 of the monitor device 11 and another voice output device may output voices. The monitor device 11 can be also used as a navigation system, an audio system, or the like. A display device 12 which is different from the display device 8 is provided inside the passenger compartment 2a.

Figure 3:
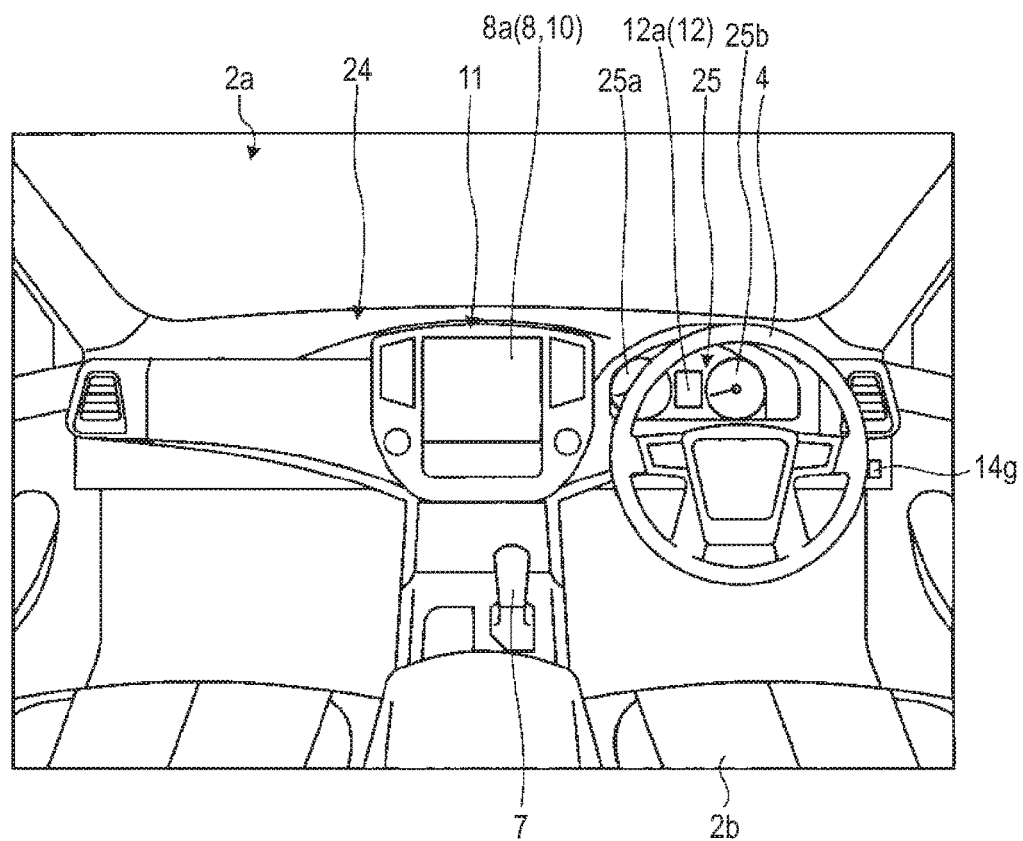
FIG. 3 is a view illustrating an example of a dashboard of the vehicle in the embodiment which is seen from the rear side of the vehicle.

FIG. 3 is a view illustrating an example of the dashboard 24 of the vehicle 1 in the embodiment which is seen from the rear side of the vehicle 1. As illustrated in FIG. 3, the display device 12 is provided in an instrument panel section 25 of the dashboard 24, and is positioned between a speed display section 25a and a rotational speed display section 25b at substantially the center of the instrument panel section 25. The size of a screen 12a of the display device 12 is smaller than the size of a screen 8a of the display device 8. The display device 12 is capable of displaying images indicating information mainly regarding assisting the driver in parking the vehicle 1. The amount of information displayed on the display device 12 may be less than the amount of information displayed on the display device 8. The display device 12 is an LCD, an OELD, or the like. The display device 8 may display information that has been displayed on the display device 12.

As illustrated in FIGS. 1 and 2, for example, the vehicle 1 is a four wheel drive vehicle, and includes two right and left front wheels 3F, and two right and left rear wheels 3R. The four vehicle wheels 3 are configured such that any of the four vehicle wheels 3 can be turned.

Figure 4:
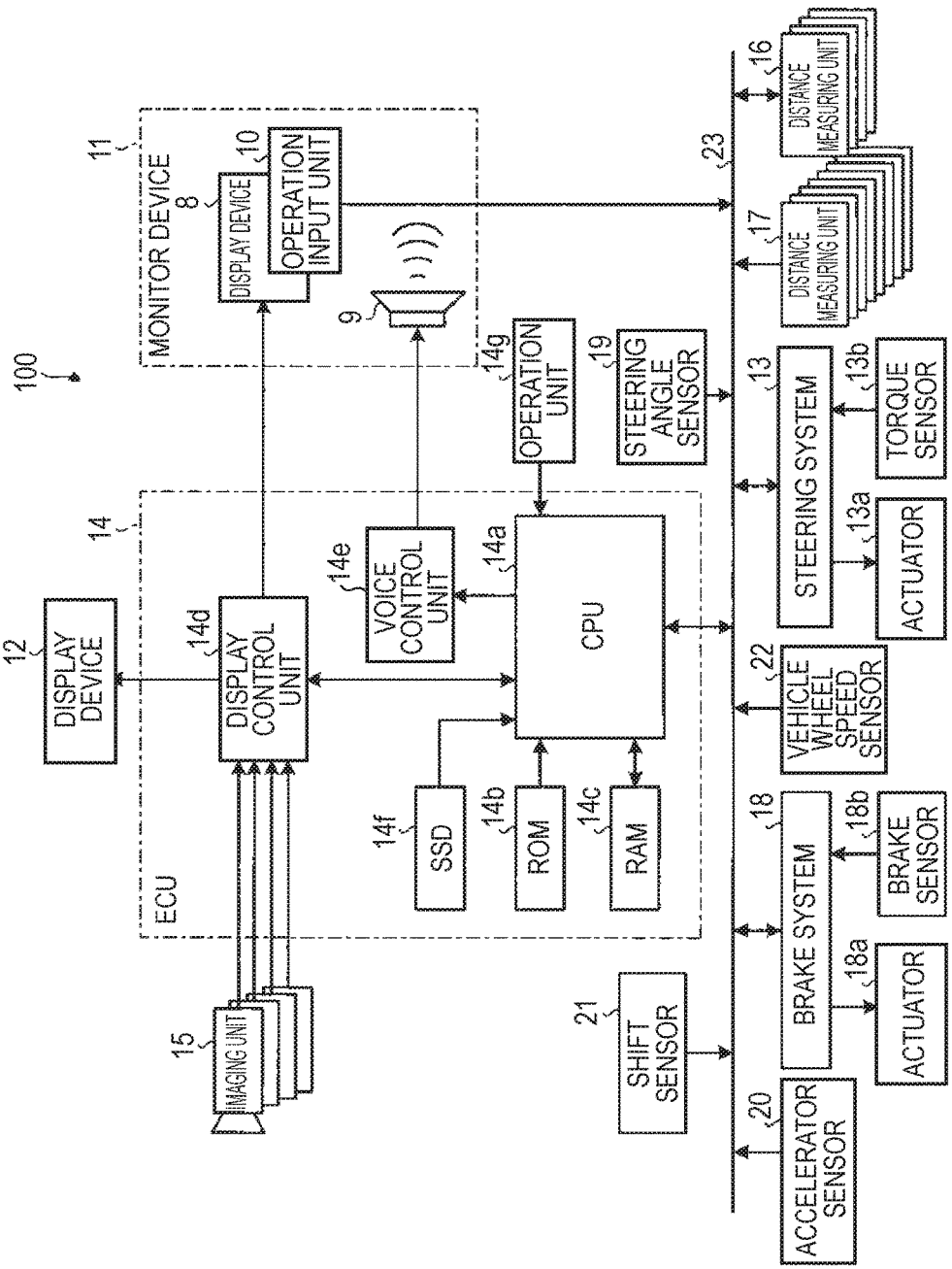
FIG. 4 is an exemplary block diagram of the configuration of a parking assistance system in the embodiment.

FIG. 4 is an exemplary block diagram of the configuration of a parking assistance system 100 in the embodiment. As illustrated in FIG. 4, the vehicle 1 includes the parking assistance system 100. The parking assistance system 100 is an example of a parking assistance device.

As illustrated in FIG. 4, the vehicle 1 includes a steering system 13 that steers at least two vehicle wheels 3. The steering system 13 includes an actuator 13a and a torque sensor 13b.

The steering system 13 is electrically controlled by an electronic control unit (ECU) 14 or the like such that the actuator 13a is operated. The steering system 13 is an electric power steering system, a steer by wire (SBW) system, or the like. The steering system 13 complements a steering force by adding torque, that is, assisted torque to the steering section 4 using the actuator 13a, or turns the vehicle wheels 3 using the actuator 13a. In this case, the actuator 13a may turn one vehicle wheel 3, or may steer a plurality of the vehicle wheels 3. For example, the torque sensor 13b detects torque that is applied to the steering section 4 by the driver.

As illustrated in FIG. 2, for example, four imaging units 15a to 15d which are a plurality of imaging units 15 are provided on the vehicle body 2. Each of the imaging units 15 is a digital camera with a built-in imaging element such as a charge coupled device (CCD) or a CMOS image sensor (CIS). Each of the imaging units 15 is capable of outputting moving image data at a predetermined frame rate. Each of the imaging units 15 includes a wide-angle lens and a fish-eye lens, and for example, is capable of capturing an image of a surrounding area in a range of 140° to 190° in a horizontal direction. The optical axis of each of the imaging units 15 is set to extend obliquely downward. Accordingly, each of the imaging units 15 sequentially captures images of an external environment around the vehicle body 2, which contains road surfaces on which the vehicle 1 is capable of moving, or areas where the vehicle 1 can be parked, and each of the imaging units 15 outputs captured image data.

For example, the imaging unit 15a is positioned at a rear end portion 2e of the vehicle body 2, and is provided on a lower wall portion of a door 2h of a rear trunk. For example, the imaging unit 15b is positioned at a right end portion 2f of the vehicle body 2, and is provided on a right rear view mirror 2g. For example, the imaging unit 15c is positioned at an end portion 2c on the front side of the vehicle body 2, that is, the front side of the vehicle body 2 in a forward and rearward direction of the vehicle, and is provided on a front bumper or the like. For example, the imaging unit 15d is positioned at an end portion 2d on the left side of the vehicle body 2, that is, the left side of the vehicle body 2 in the lateral direction of the vehicle, and is provided on a left rear view mirror 2g which is a protrusion.

The ECU 14 is capable of generating a wider angle image, or generating a virtual bird's-eye view image of the vehicle 1, which is viewed from the top, by executing computational processes or image processing of image data obtained by the plurality of imaging units 15. A bird's-eye view image is referred to as a planar image. The ECU 14 identifies stall lines or the like, which are marked on road surfaces around the vehicle 1, in images captured by the imaging units 15, and detects (extracts) parking stalls marked by stall lines.

As illustrated in FIGS. 1 and 2, for example, four distance measuring units 16a to 16d and eight distance measuring units 17a to 17h which are a plurality of distance measuring units 16 and 17 are provided on the vehicle body 2. For examples, the distance measuring units 16 and 17 are sonars that emit ultrasonic waves and capture reflected waves. A sonar is also referred to as a sonar sensor or an ultrasonic detector. The ECU 14 is capable of identifying the presence of an object such as an obstacle positioned around the vehicle 1, and measuring the distance from the vehicle 1 to the object, based on results of detection by the distance measuring units 16 and 17. That is, the distance measuring units 16 and 17 are examples of a detection unit that detects objects. For example, each of the distance measuring units 17 is used to detect an object positioned a relatively short distance away therefrom. Compared to the distance measuring units 17, each of the distance measuring units 16 is used to detect an object positioned far away therefrom, that is, positioned a relatively long distance therefrom. The distance measuring units 17 are used to detect objects in front and back of the vehicle 1. The distance measuring units 16 are used to detect objects besides the vehicle 1.

As illustrated in FIG. 4, in the parking assistance system 100, in addition to the ECU 14, the monitor device 11, the steering system 13, the distance measuring units 16 and 17, and the like, a brake system 18, a steering angle sensor 19, an accelerator sensor 20, a shift sensor 21, and a vehicle wheel speed sensor 22 are electrically connected to each other via an in-vehicle network 23 which is a telecommunication line.

For example, the in-vehicle network 23 is configured as a controller area network (CAN). The ECU 14 is capable of controlling the steering system 13, the brake system 18, or the like by sending control signals via the in-vehicle network 23 thereto. Via the in-vehicle network 23, the ECU 14 is capable of receiving results of detection by the torque sensor 13b, the brake sensor 18b, the steering angle sensor 19, the distance measuring units 16, the distance measuring units 17, the accelerator sensor 20, the shift sensor 21, the vehicle wheel speed sensor 22, and the like, or operation signals from the operation input unit 10 and the like.

The ECU 14 includes a central processing unit (CPU) 14a; a read only memory (ROM) 14b; a random access memory (RAM) 14c; a display control unit 14d; a voice control unit 14e; a solid state drive (SSD) (flash memory) 14f; and the like.

The CPU 14a is capable of executing various computational processes and controls such as the processing of images displayed on the display devices 8 and 12, the determination of a movement target position of the vehicle 1, the computing of a movement route of the vehicle 1, a determination as to whether or not the vehicle 1 interferes with an object, automatic control of the vehicle 1, and the releasing of automatic control. The CPU 14a is capable of reading a program installed and stored in a non-volatile storage device such as the ROM 14b, and executing calculations according to the program. The RAM 14c temporarily stores various data which is used in computations performed by the CPU 14a. Among the computational processes performed by the ECU 14, the display control unit 14d mainly executes image processing of image data obtained by the imaging units 15, and the composition of image data to be displayed on the display device 8. Among the computational processes performed by the ECU 14, the voice control unit 14e mainly executes processing of voice data output from the voice output device 9. The SSID 14f is a rewritable non-volatile storage unit, and is capable of storing data even if a power supply of the ECU 14 is turned off. The CPU 14a, the ROM 14b, the RAM 14c, and like may be integrated into one package. Instead of the CPU 14a, the ECU 14 may be configured to include another logical processor such as a digital signal processor (DSP), or a logic circuit. A hard disk drive (HDD) may be provided instead of the SSD 14f. The SSD 14f and an HDD may be provided separately from the ECU 14.

The brake system 18 is an anti-lock brake system (ABS) that prevents locking of the brakes, an electronic stability control (ESC) that prevents skidding of the vehicle 1 during cornering, an electric brake system that enhances braking force (executes braking assist), a brake by wire (BBW), or the like.

The brake system 18 applies braking force to the vehicle wheels 3, and eventually to the vehicle 1 via an actuator 18a. The brake system 18 is capable of detecting locking of the brakes, slipping of the vehicle wheels 3, or signs of skidding from a difference between the rotational speeds of the right and left vehicle wheels 3, and executing various controls. For example, a brake sensor 18b is a sensor that detects the position of a movable portion of the brake operation section 6. The brake sensor 18b is capable of detecting the position of the brake pedal which is a movable portion of the brake operation section 6. The brake sensor 18b includes a displacement sensor.

The steering angle sensor 19 is a sensor that detects the amount of steering of the steering section 4 such as a steering wheel. The steering angle sensor 19 is configured to include a hall element or the like. The ECU 14 acquires the amount of steering of the steering section 4 performed by the driver, or the amount of steering of each vehicle wheel 3 during automatic steering from the steering angle sensor 19, and executes various controls. The steering angle sensor 19 detects the rotational angle of a rotating part of the steering section 4. The steering angle sensor 19 is an example of an angle sensor.

For example, the accelerator sensor 20 is a sensor that detects the position of a movable portion of the acceleration operation section 5. The accelerator sensor 20 is capable of detecting the position of the accelerator pedal which is a movable portion. The accelerator sensor 20 includes a displacement sensor.

For example, the shift sensor 21 is a sensor that detects the position of a movable portion of the shift operation section 7. The shift sensor 21 is capable of detecting the position of a lever, an arm, a button, or the like which is a movable portion of the shift operation section 7. The shift sensor 21 may include a displacement sensor, or may be configured as a switch.

The vehicle wheel speed sensor 22 is a sensor that detects the amount of rotation, or revolutions per unit time of the vehicle wheel 3. The vehicle wheel speed sensor 22 outputs the number of wheel speed pulses as a sensor value which indicates the detected revolutions. The vehicle wheel speed sensor 22 may be configured to include a hall element or the like. The ECU 14 computes the amount of movement of the vehicle 1 based on the sensor value acquired from the vehicle wheel speed sensor 22, and executes various controls. In some cases, the vehicle wheel speed sensor 22 may be provided in the brake system 18. In this case, the ECU 14 acquires results of detection by the vehicle wheel speed sensor 22 via the brake system 18.

The configuration, the arrangement, and the electrical connection form of various sensors and the actuators described above are merely examples, and can be set (changed) in various forms.

In the embodiment, the ECU 14 realizes at least a portion of functions of the parking assistance device via collaboration between hardware and software (control program).

Figure 5:
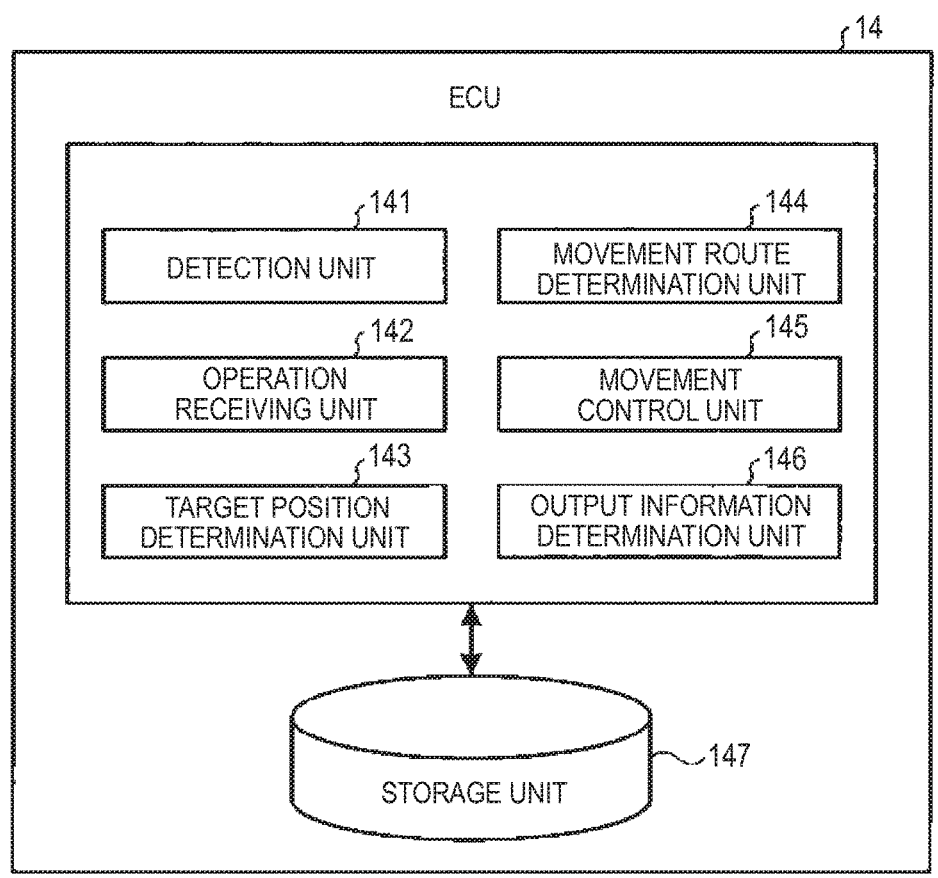
FIG. 5 is a block diagram of the functional configuration of an ECU in the embodiment.

FIG. 5 is a block diagram of the functional configuration of the ECU in the embodiment. As illustrated in FIG. 5, the ECU 14 serves as a detection unit 141, an operation receiving unit 142, a target position determination unit 143, a movement route determination unit 144, a movement control unit 145, an output information determination unit 146, and a storage unit 147. The detection unit 141 is an example of an obstacle detection unit. The target position determination unit 143 is an example of a target determination unit. The movement route determination unit 144 is an example of a route determination unit.

In the aforementioned configuration, the detection unit 141 detects obstacles such as other vehicles, walls, and road cones, border lines such as parking stall lines, and the like. The operation receiving unit 142 acquires operation signals generated by an input operation of an operation unit 14g. The operation unit 14g is a pressable button, a switch, or the like, and outputs operation signals. The target position determination unit 143 determines a movement target position (target parking position) of the vehicle 1, and a movement target area (target parking area) associated therewith. The movement route determination unit 144 determines a movement route of the vehicle 1 to a movement target position. The movement control unit 145 assists the driver in parking the vehicle 1 by controlling each part of the vehicle 1 such that the vehicle 1 moves to a movement target position (target parking position) along a movement route. The output information determination unit 146 determines information output from the display devices 12 and 8, the voice output device 9, and the like, and the output form of each information. The storage unit 147 stores data that is to be used in computations performed by the ECU 14, or has been calculated in computations performed by the ECU 14.

Figure 6:
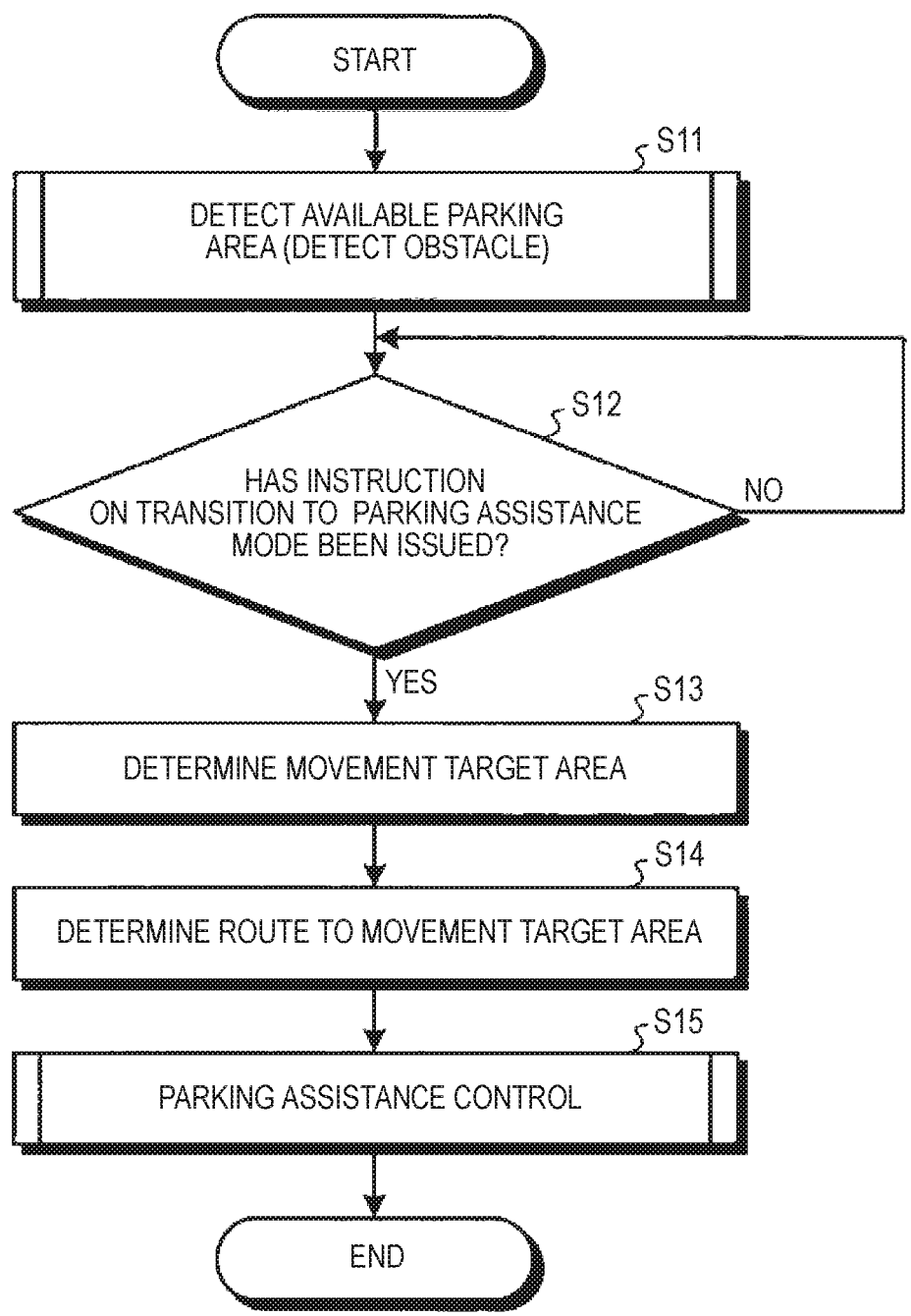
FIG. 6 is a flowchart outlining a process in the embodiment.

Hereinafter, an example of the operation of the parking assistance system 100 in the embodiment will be described. The operation of the parking assistance system 100 is not limited to an operation which will be described hereinafter. FIG. 6 is a flowchart outlining a process in the embodiment.

Figure 7:
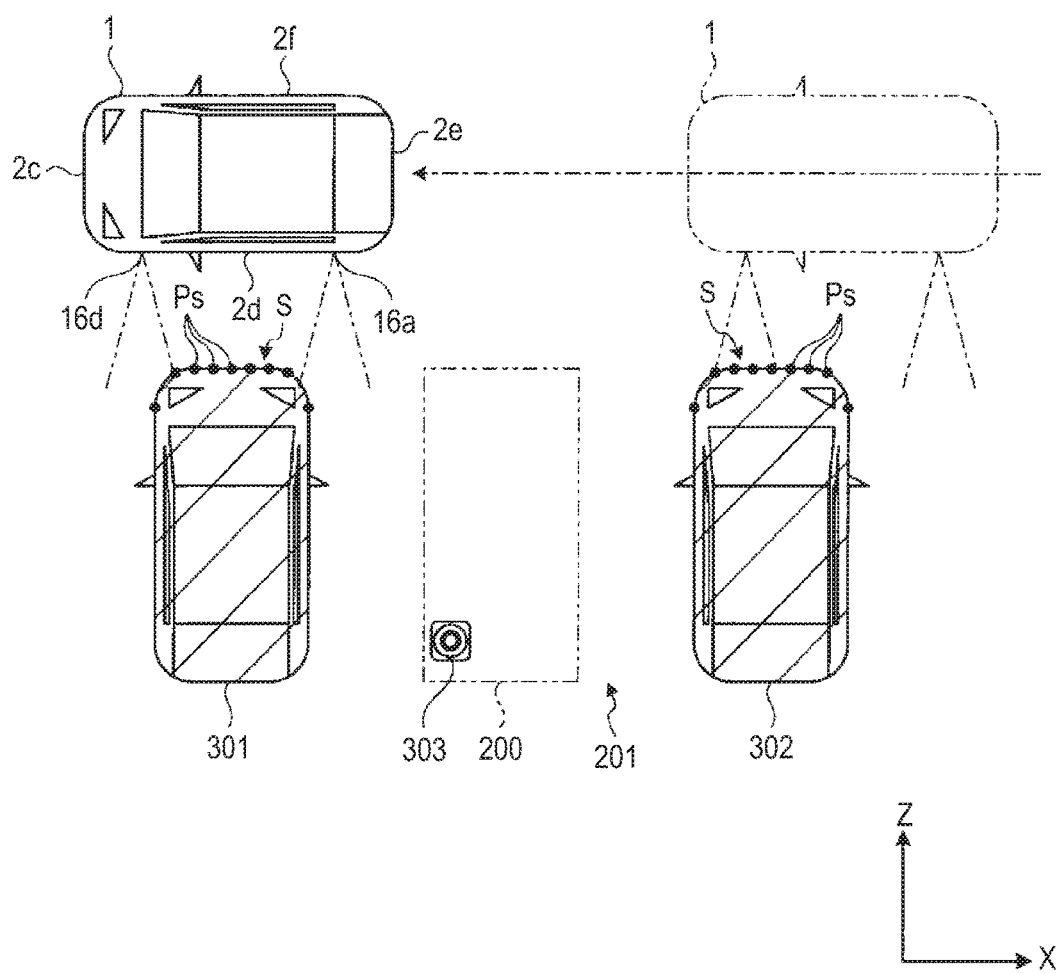
FIG. 7 is a plan view illustrating the detection of available parking areas in the embodiment.

As illustrated in FIG. 6, first, the ECU 14 detects available parking areas (detects obstacles) (S11). FIG. 7 is a plan view illustrating the detection of available parking areas in the embodiment. As illustrated in FIG. 7, the distance measuring units 16a to 16d calculate the distances to obstacles such as other vehicles 301 and 302 at predetermined sampling timings, and output the calculated distances as data that corresponds to reflective portions S (each of which is an aggregation of reflection points Ps at which sound waves or the like are reflected) of the obstacles. For example, the RAM 14c stores the output data at output intervals.

The ECU 14 serves as the detection unit 141 to independently detect available parking areas 201 positioned on both the right and the left sides of the vehicle 1, based on the output data of the distance measuring units 16a to 16d. Hereinafter, for purpose of easy understanding, a method of detecting an available parking area 201 on the left side of the vehicle 1 will be described.

If output data corresponding to an obstacle has been output for a first predetermined length of time or longer, and thereafter, output data corresponding to the non-presence of an obstacle having the minimum required width of a parking area available for the vehicle 1 (including a case in which the distance to the obstacle is greater than or equal to a length in the forward and rearward direction of the vehicle, which is required to park the vehicle) has been output for a second predetermined length of time or longer, the detection unit 141 determines that the available parking area 201 is present.

The detection unit 141 may detect parking stall lines such as white lines which are provided on a traveling surface such as the ground or a road surface, based on captured image data output from the imaging unit 15a that captures images of the rear side of the vehicle 1. For example, the detection unit 141 detects parking stall lines by performing edge extraction on captured image data that is output from the imaging units 15a to 15d during backward movement, forward movement, or stopping of the vehicle 1.

The detection of available parking areas will be specifically exemplified with reference to FIG. 7. For example, the vehicle 1 passes in front of the other vehicles 301 and 302 which are double parked. At this time, sound waves or the like emitted by the distance measuring units 16a and 16d are reflected by a plurality of the reflection points Ps of each of the other vehicles 301 and 302. The distance measuring units 16a to 16d calculate the distances to the other vehicles 301 and 302 based on the sound waves or the like reflected by the reflection points Ps.

The ECU 14 serving as the detection unit 141 detects the other vehicles 301 and 302 based on data output from the distance measuring units 16a and 16d. With attention to detail, the detection unit 141 detects the other vehicle 301 based on data corresponding to the reflective portion S which is an aggregation of the plurality of reflection points Ps on the other vehicle 301. In addition, the detection unit 141 detects the other vehicle 302 based on data corresponding to the reflective portion S which is an aggregation of the plurality of reflection points Ps on the other vehicle 302.

The other vehicles 301 and 302 are double parked while being spaced away from each other. In other words, the other vehicles 301 and 302 are parked in a row in the rightward and leftward direction. The available parking area 201 is an area between the other vehicles 301 and 302.

Returning to FIG. 6, hereinafter, the ECU 14 serves as the operation receiving unit 142 to determine whether an instruction on transition to a parking assistance mode has been issued via the operation unit 14g (S12). In a case where an instruction on transition to the parking assistance mode has not yet been issued via the operation unit 14g (S12: No), the operation receiving unit 142 enters a standby mode.

In a case where it is determined in S12 that an instruction on transition to the parking assistance mode has been issued via the operation unit 14g (S12: Yes), the ECU 14 serves as the target position determination unit 143 to determine a movement target area (target parking area) 200 of the vehicle 1 (S13). The movement target area 200 is an example of a target area.

As illustrated in FIG. 7, the movement target area 200 is disposed inside the available parking area 201. In other words, the movement target area 200 is determined such that the movement target area 200 is positioned between the other vehicles 301 and 302. The movement target area 200 is an area in which the vehicle 1 is accommodated when parking is complete. In a plan view, the size of the movement target area 200 is substantially the same as the occupancy space of the vehicle 1.

As illustrated in each drawing, in the embodiment, an X direction and a Z direction are determined. The X direction is a rightward and leftward direction of the movement target area 200. In other words, the X direction is the rightward and leftward direction of the vehicle 1 accommodated in the movement target area 200. The Z direction is a forward and rearward direction of the movement target area 200. In other words, the Z direction is the forward and rearward direction of the vehicle 1 accommodated in the movement target area 200. The Z direction is perpendicular to the X direction. In the embodiment, the other vehicles 301 and 302 are parked in a row in the X direction.

Figure 8:
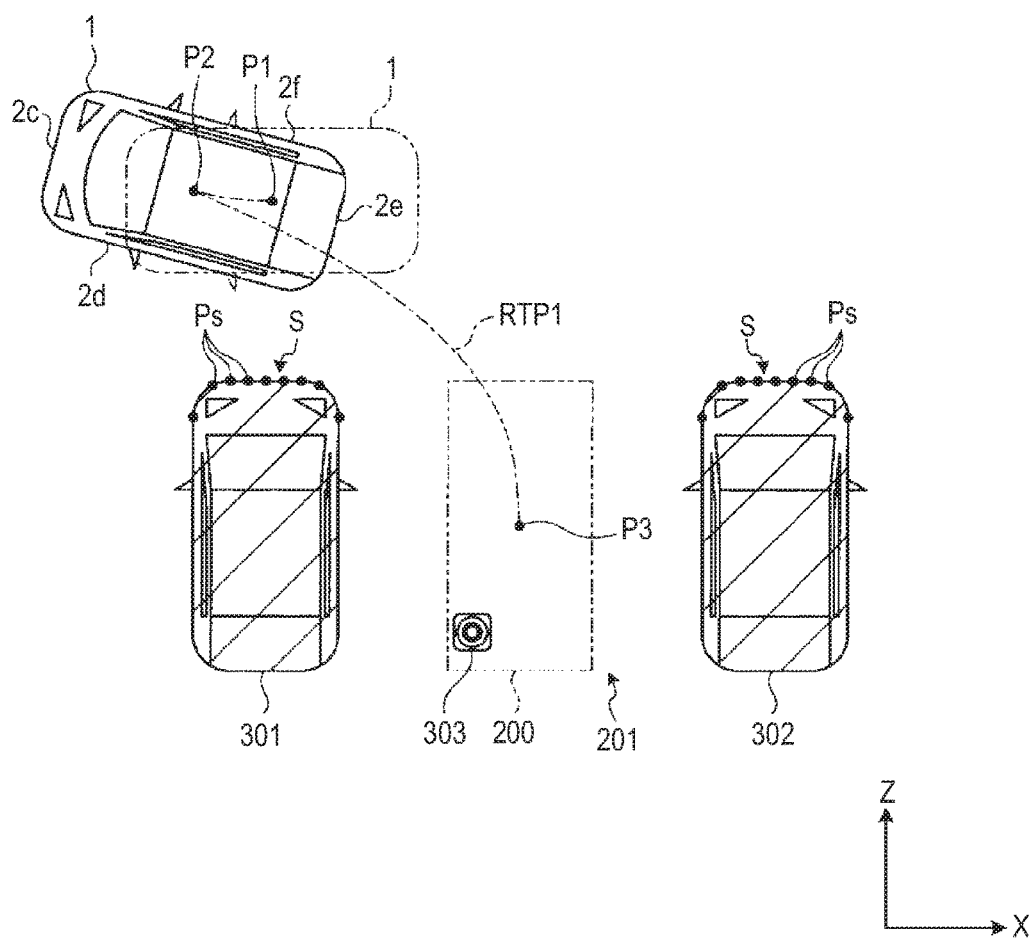
FIG. 8 is a plan view illustrating an example of the setting of a movement route in the embodiment.

Returning to FIG. 6, subsequently, the ECU 14 serves as the movement route determination unit 144 to determine a movement route of the vehicle 1 to the movement target area 200 (S14). FIG. 8 is a plan view illustrating an example of the setting of a movement route in the embodiment. Hereinafter, as illustrated in FIG. 8, a case in which a movement route contains one reverse turning position will be described. A movement route is not limited to that case. A movement route may not contain any reverse turning position, or may contain a plurality of reverse turning positions.

First, the movement route determination unit 144 determines a first movement route RTP1 from an initial position P1 when a parking assistance control process of the vehicle 1 is started, to a target parking position P3 via a reverse turning position P2. The initial position P1 is an example of the position of the vehicle. For example, the target parking position P3 is the position of the central point of the vehicle 1 when the parking of the vehicle 1 in the movement target area 200 is complete. If the target position determination unit 143 determines the movement target area 200, the target parking position P3 is determined. In FIG. 8, the vehicle 1 positioned at the initial position P1 is illustrated by an alternate one long and two short dashes line, and the vehicle 1 positioned at the reverse turning position P2 is illustrated by a solid line.

The first movement route RTP1 is formed such that a driver drives the vehicle 1 forward toward the reverse turning position P2 of the steering wheel (the steering section 4) while turning the steering wheel (the steering section 4) right by a predetermined amount, stops the vehicle 1 by pressing the brakes (the brake operation section 6) at the reverse turning position P2, changes a gear position to a reverse position (back), and turns the steering wheel (the steering section 4) left toward the target parking position P3. For example, the first movement route RTP1 is a route that contains an arc, a clothoid curve, and a straight line.

Figure 9:
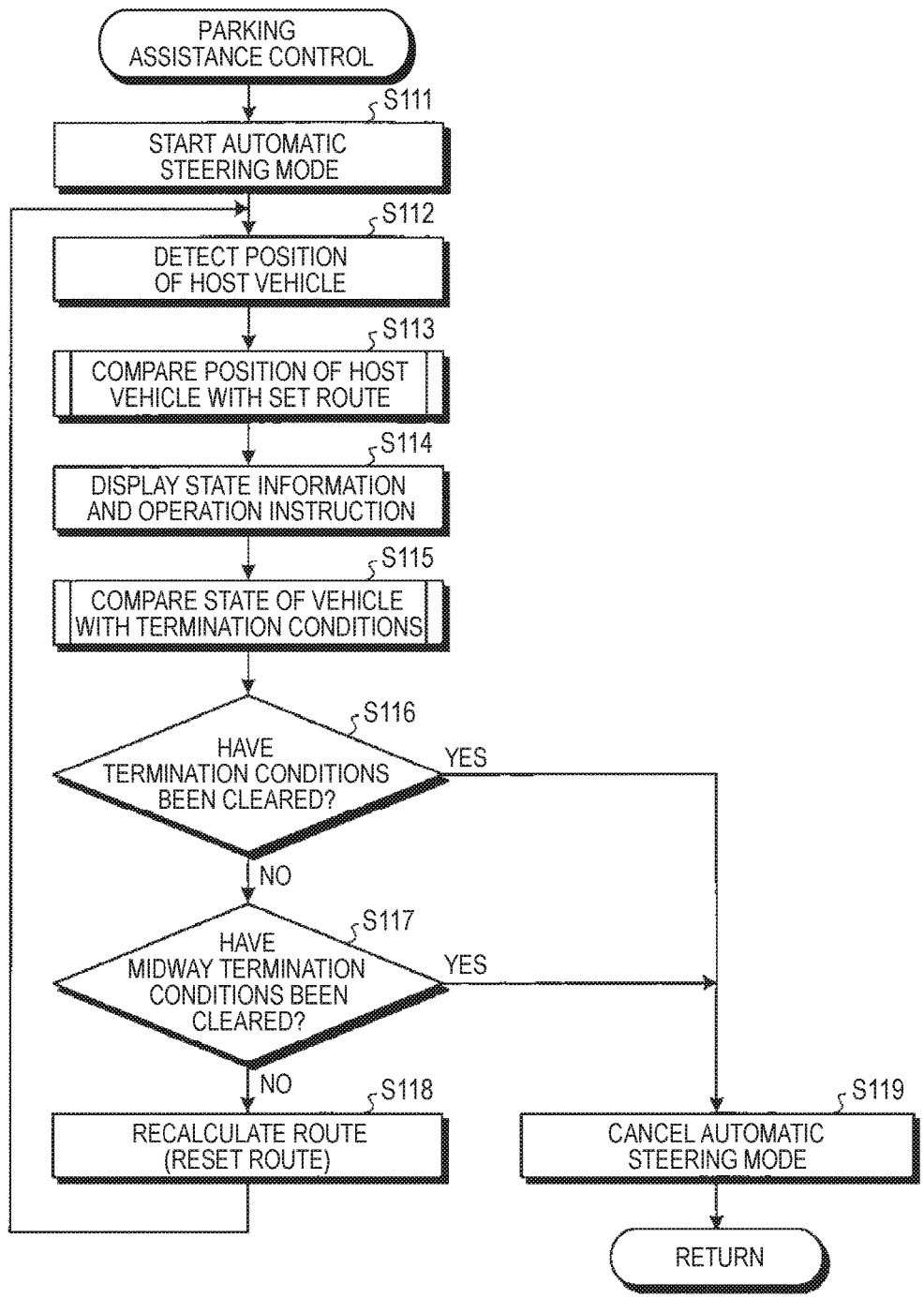
FIG. 9 is a process flowchart illustrating a parking assistance control process in the embodiment.

Returning to FIG. 6, if the first movement route RTP1 is determined, the ECU 14 transits to parking assistance control (S15). FIG. 9 is a process flowchart illustrating the parking assistance control process in the embodiment.

First, the ECU 14 serves as the movement control unit 145 to start an automatic steering mode in which automatic steering is performed, so as to control each part of the vehicle 1 such that the vehicle 1 moves to the target parking position P3 of the movement target area 200 along the first movement route RTP1 (S111).

In the automatic steering mode of the embodiment, it is not necessary for the driver to operate the steering section 4, specifically, to operate the steering wheel. A forward movement drive force and a rearward movement drive force of the vehicle 1 in the parking assistance control process are generated by creeping that allows a drive force of an engine to be transmitted to the vehicle 1 even if the driver does not press the accelerator pedal, that is, does not operate the acceleration operation section 5.

For this reason, the driver merely operates the brake pedal as the brake operation section 6 and the shift lever as the shift operation section 7 according to display on the display device 12. In the automatic steering mode, the brake pedal as the brake operation section 6 and the shift lever as the shift operation section 7 may be automatically operated.

Subsequently, the ECU 14 serving as the movement control unit 145 detects the position of the host vehicle (S112). Specifically, the ECU 14 detects the position of the host vehicle by calculating the distance of the vehicle 1, which is the amount of movement from the initial position P1, and the direction of the vehicle 1 based on the amount of steering of the steering section 4 detected by the steering angle sensor 19, and a vehicle speed detected by the vehicle wheel speed sensor 22.

The ECU 14 compares the set route with the position of the host vehicle (S113). The ECU 14 serves as the output information determination unit 146 to determine information regarding the state of the vehicle and an operation instruction to the driver, and to display the state information and the operation instruction on the display device 12 (S114). Subsequently, the ECU 14 serves as the movement control unit 145 to compare the state of the vehicle 1 with termination conditions of the parking assistance control (S115).

Figure 10:
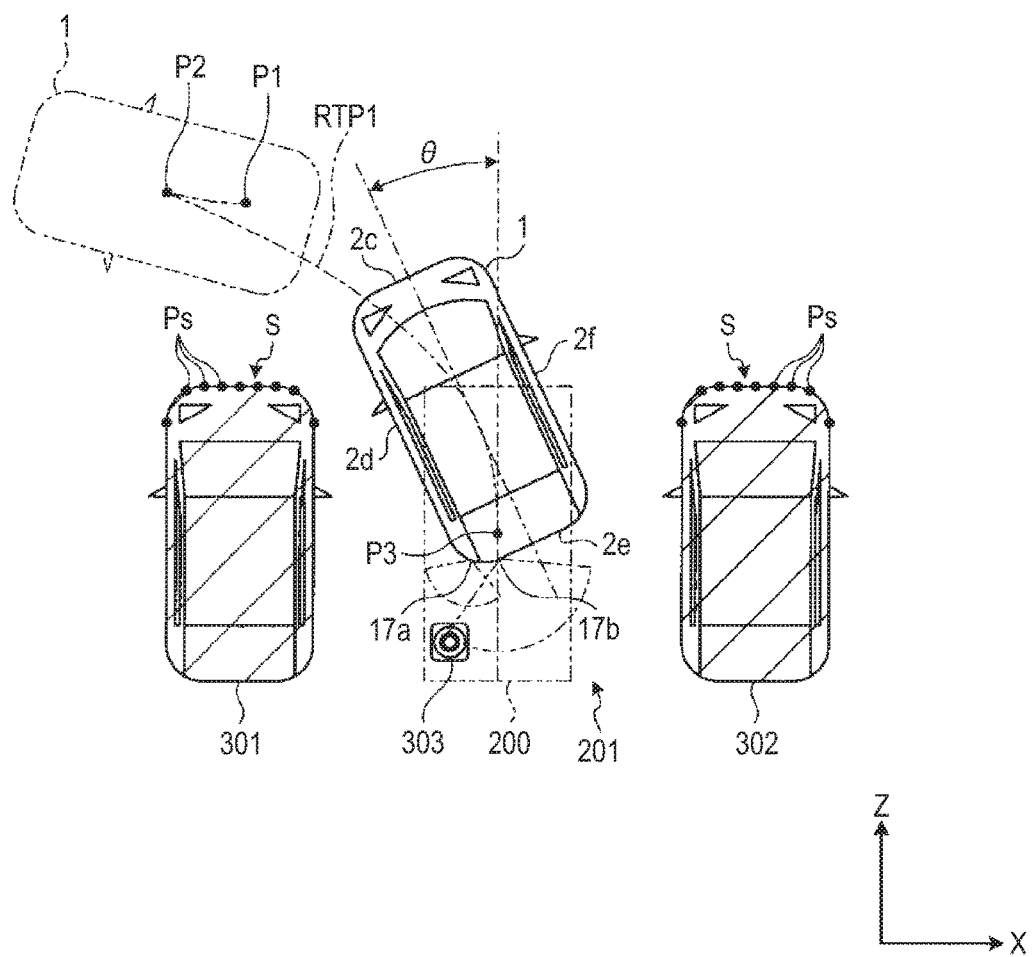
FIG. 10 is a plan view illustrating termination conditions in the embodiment.
Figure 11:
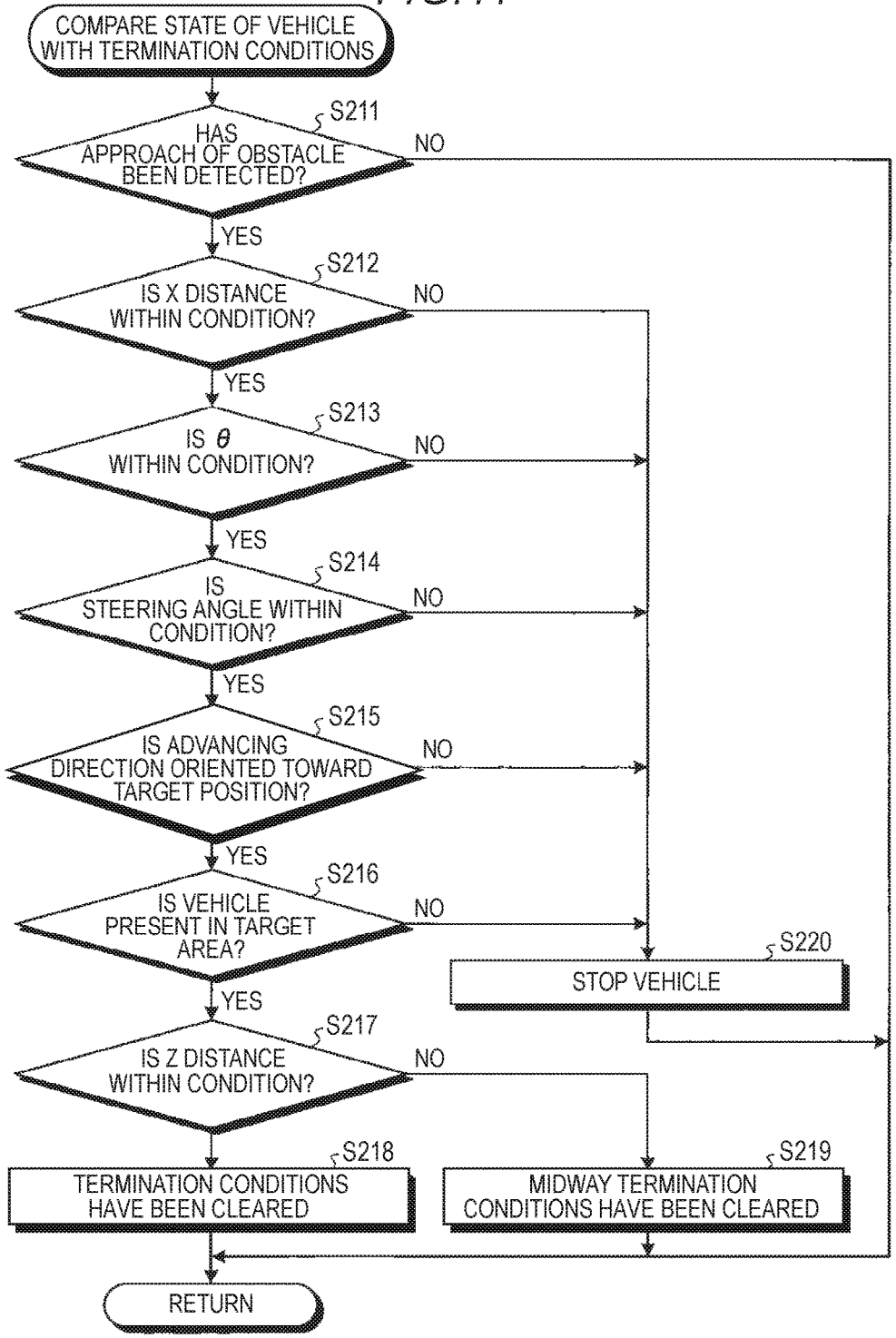
FIG. 11 is a process flowchart illustrating a process of comparing the state of the vehicle with the termination conditions in the embodiment.

FIG. 10 is a plan view illustrating the termination conditions in the embodiment. FIG. 11 is a process flowchart illustrating a process of comparing the state of the vehicle 1 with the termination conditions in the embodiment. Hereinafter, the termination conditions of the parking assistance control will be described. As illustrated in FIG. 11, first, the ECU 14 serves as the detection unit 141 to determine whether the approach of an undetected obstacle has been detected (S211).

As illustrated in FIG. 10, an obstacle 303 may be present in or in the vicinity of the movement target area 200. The obstacle 303 is an obstacle that has not initially been detected by the detection unit 141 (S11).

For example, the obstacle 303 is a road cone having a substantially conical shape. During the detection of available parking areas in S11, the obstacle 303 is positioned further away from the vehicle 1 than front end portions of the other vehicles 301 and 302. The distance measuring units 16a to 16d may have difficulty detecting a relatively small obstacle, an obstacle having a circular section, and an obstacle positioned far away therefrom. For this reason, the obstacle 303 has not been detected during the detection of available parking areas in S11.

The obstacle 303 is positioned closer to the other vehicle 301 from the other vehicle 302. The other vehicle 301 is closer to the initial position P1 of the vehicle 1 than the other vehicle 302. The obstacle 303 is positioned inside of (positioned close to the center) the first movement route RTP1 containing an arc and clothoid curve. The obstacle 303 is positioned further away from the front end portions of the other vehicles 301 and 302 than the movement target position P3. The obstacle 303 may be present at another position.

If parking assistance is activated, and the vehicle 1 travels along the first movement route RTP1 determined by the movement route determination unit 144, the vehicle 1 approaches the obstacle 303. If the vehicle 1 approaches the obstacle 303, at least one of the plurality of distance measuring units 16 and 17 of the vehicle 1 outputs data corresponding to the obstacle 303.

If exemplified in detail, when the vehicle 1 moves rearward, the obstacle 303 reflects sound waves or the like which are emitted by one of the distance measuring units 17a and 17b disposed at the rear end portion 2e of the vehicle 1. The distance measuring unit 17a or 17b calculates the distance to the obstacle 303 based on the sound waves or the like.

In a case where both of the distance measuring units 17a and 17b have detected the distances to the obstacle 303, the detection unit 141 detects the presence and the position of the obstacle 303 based on the distances to the obstacle 303 calculated by the distance measuring units 17a and 17b.

Specifically, the detection unit 141 detects the position of the obstacle 303 via triangulation based on the distance to the obstacle 303 detected by the distance measuring unit 17a, and the distance to the obstacle 303 detected by the distance measuring unit 17b. In this case, the ECU 14 serving as the detection unit 141 detects the approach of the obstacle 303 by comparing the position of the obstacle 303 with the position of the vehicle 1.

One of the plurality of distance measuring units 16 and 17 may detect the obstacle 303 that is relatively small and has a circular section. For example, in a case where only one of the distance measuring units 17a and 17b has detected the distance to the obstacle 303, the detection unit 141 detects the presence of the obstacle 303, but the position of the obstacle 303 is uncertain. The ECU 14 serving as the detection unit 141 detects the approach of the obstacle 303 based on the distance to the obstacle 303 detected by one of the distance measuring units 17a and 17b.

The distance measuring unit 17a is disposed at a rear corner (corner at which the end portion 2d intersects with the end portion 2e) of the vehicle body 2. The distance measuring unit 17a is an example of a first distance measuring unit. In a case where the distance to the obstacle 303 detected by the distance measuring unit 17a is less than a first threshold value, the ECU 14 serving as the detection unit 141 detects the approach of the obstacle.

In contrast, the distance measuring unit 17b is disposed closer to the center of the vehicle 1 than the distance measuring unit 17a. The distance measuring unit 17b is an example of a second distance measuring unit. In a case where the distance to the obstacle 303 detected by the distance measuring unit 17b is less than a second threshold value, the ECU 14 serving as the detection unit 141 detects the approach of the obstacle. The second threshold value is greater than the first threshold value.

Returning to FIG. 11, in a case where the approach of the obstacle 303 has been detected (S211: Yes), the ECU 14 serves as the movement control unit 145 to determine whether the distance between the movement target area 200 (the target parking position P3) and the vehicle 1 in the X direction is within the range of a condition (S212). The ECU 14 serving as the movement control unit 145 calculates the distance (X distance) between the movement target area 200 (the target parking position P3) and the vehicle 1 in the X direction. The movement control unit 145 determines whether the X distance is within an allowable range set in advance. The allowable range of the X distance is an example of a first range.

In a case where the X distance is within the allowable range (S212: Yes), the ECU 14 serving as the movement control unit 145 determines whether an inclination angle θ of the vehicle 1 is within the range of a condition (S213). The movement control unit 145 calculates the inclination angle θ of a central axis (illustrated by an alternate long and short dash line in FIG. 10) of the vehicle 1 relative to a central axis of the movement target area 200. The central axis is an imaginary line of each of the vehicle 1 and the movement target area 200 which extends in the forward and rearward direction. In other words, the movement control unit 145 calculates the inclination angle θ of the vehicle 1 relative to the Z direction. The movement control unit 145 determines whether the inclination angle θ is within an allowable range set in advance. The allowable range of the inclination angle θ is an example of a second range.

In a case where the inclination angle θ is within the allowable range (S213: Yes), the ECU 14 serving as the movement control unit 145 determines whether the steering angle of the vehicle 1 is within the range of a condition (S214). The movement control unit 145 acquires the steering angle of the steering wheel (the steering section 4) from the steering angle sensor 19, and determines whether the steering angle is within an allowable range set in advance. The allowable range of the steering angle is an example of a fourth range.

In a case where the steering angle is within the allowable range (S214: Yes), the ECU 14 serving as the movement control unit 145 determines whether an advancing direction of the vehicle 1 in the Z direction is oriented toward the target parking position P3 (S215). In a case where the vehicle 1 moves rearward toward the target parking position P3 present in back of the vehicle 1 in the Z direction, the movement control unit 145 determines that the advancing direction of the vehicle 1 is oriented toward the target parking position P3. In a case where a target parking position is present in front of the vehicle 1 in the Z direction, the vehicle 1 moves forward, the movement control unit 145 determines that the advancing direction of the vehicle 1 is oriented toward the target parking position.

In a case where the advancing direction of the vehicle 1 is oriented toward the target parking position P3 (S215: Yes), the ECU 14 serving as the movement control unit 145 determines whether at least a portion of the vehicle 1 is present in the movement target area 200 (S216).

In a case where at least a portion of the vehicle 1 is present in the movement target area 200 (S216: Yes), the ECU 14 serving as the movement control unit 145 determines whether the distance between the movement target area 200 (the target parking position P3) and the vehicle 1 in the Z direction is within the range of a condition (S217). The ECU 14 serving as the movement control unit 145 calculates the distance (Z distance) between the movement target area 200 (the target parking position P3) and the vehicle 1 in the Z direction. The movement control unit 145 determines whether the Z distance is within an allowable range set in advance. The allowable range of the Z distance is an example of a third range.

In a case where the Z distance is within the allowable range (S217: Yes), the ECU 14 serving as the movement control unit 145 determines that the termination conditions have been cleared (S218). In other words, the movement control unit 145 sets a flag to clear the termination conditions. If a flag is set to clear the termination conditions, the process of comparing the state of the vehicle 1 with the termination conditions is terminated.

If the vehicle 1 has traveled along the first movement route RTP1, and has reached the target parking position P3, the X distance, the inclination angle θ, the steering angle, and the Z distance are within the respective allowable ranges (S212: Yes, S213: Yes, S214: Yes, and S217: Yes), the advancing direction is oriented toward the target position (S215: Yes), and then the vehicle 1 is present in the movement target area 200 (S216: yes). For this reason, in the processing of comparing the state of the vehicle 1 with the termination conditions, it may be determined whether the vehicle 1 has reached the target parking position P3. In a case where the vehicle 1 has reached the target parking position P3, it may be determined that the termination conditions have been cleared (S218).

In a case where the Z distance is outside of the allowable range (S217: No), the ECU 14 serving as the movement control unit 145 determines that midway termination conditions have been cleared (S219). In other words, the movement control unit 145 sets a flag to clear the midway termination conditions. If a flag is set to clear the midway termination conditions, the process of comparing the state of the vehicle 1 with the termination conditions is terminated.

In a case where at least one of the X distance, the inclination angle θ, and the steering angle is outside of the allowable range (S212: No, S213: No, or S214: No), the advancing direction is not oriented toward the target position (S215: No), or the vehicle 1 is present outside the movement target area 200 (S216: No), the ECU 14 serves as the movement control unit 145 to stop the vehicle 1 (S220). For example, the ECU 14 serving as the movement control unit 145 controls the brake system 18 such that the vehicle 1 is stopped. If the vehicle 1 is stopped, the process of comparing the state of the vehicle 1 with the termination conditions is terminated.

In a case where the approach of the obstacle 303 has not been detected in S211 (S211: No), the process of comparing the state of the vehicle 1 with the termination conditions is terminated. Hereinafter, first, a case in which the approach of the obstacle 303 has not been detected will be described.

Returning to FIG. 9, if the process of comparing the state of the vehicle 1 with the termination conditions is terminated, the ECU 14 serves as the movement control unit 145 to determine whether the termination conditions have been cleared (S116). Since the termination conditions have not yet been cleared in the described case (S116: No), subsequently, the ECU 14 serves as the movement control unit 145 to determine whether the midway termination conditions have been cleared (S117). Since the midway termination conditions have also not yet been cleared in the described case (S117: No), the ECU 14 serves as the movement route determination unit 144 to transit to the recalculation (S118) of a movement route.

Depending on road surface conditions or the like, the vehicle 1 does not necessarily move along a set movement route (for example, the first movement route RTP1). For this reason, a route more optimized for actual situations is maintained by recalculating and resetting a movement route.

The ECU 14 causes the process to transit to S112 again, and then repeats the same process. That is, in an automatic steering mode, the movement control unit 145 controls each part of the vehicle 1 such that the vehicle 1 travels along the first movement route RTP1 according to various controls.

If the vehicle 1 travels, as illustrated in FIG. 10, the obstacle 303 approaches the vehicle 1. In this case, in S211 illustrated in FIG. 11, the ECU 14 serving as the detection unit 141 detects the approach of the obstacle 303 (S211: Yes). In the example illustrated in FIG. 10, at least one of the X distance, the inclination angle θ, and the steering angle is outside of the allowable range (S212: No, S213: No, or S214: No). For this reason, the ECU 14 serving as the movement control unit 145 stops the vehicle 1 (S220).

Figure 12:
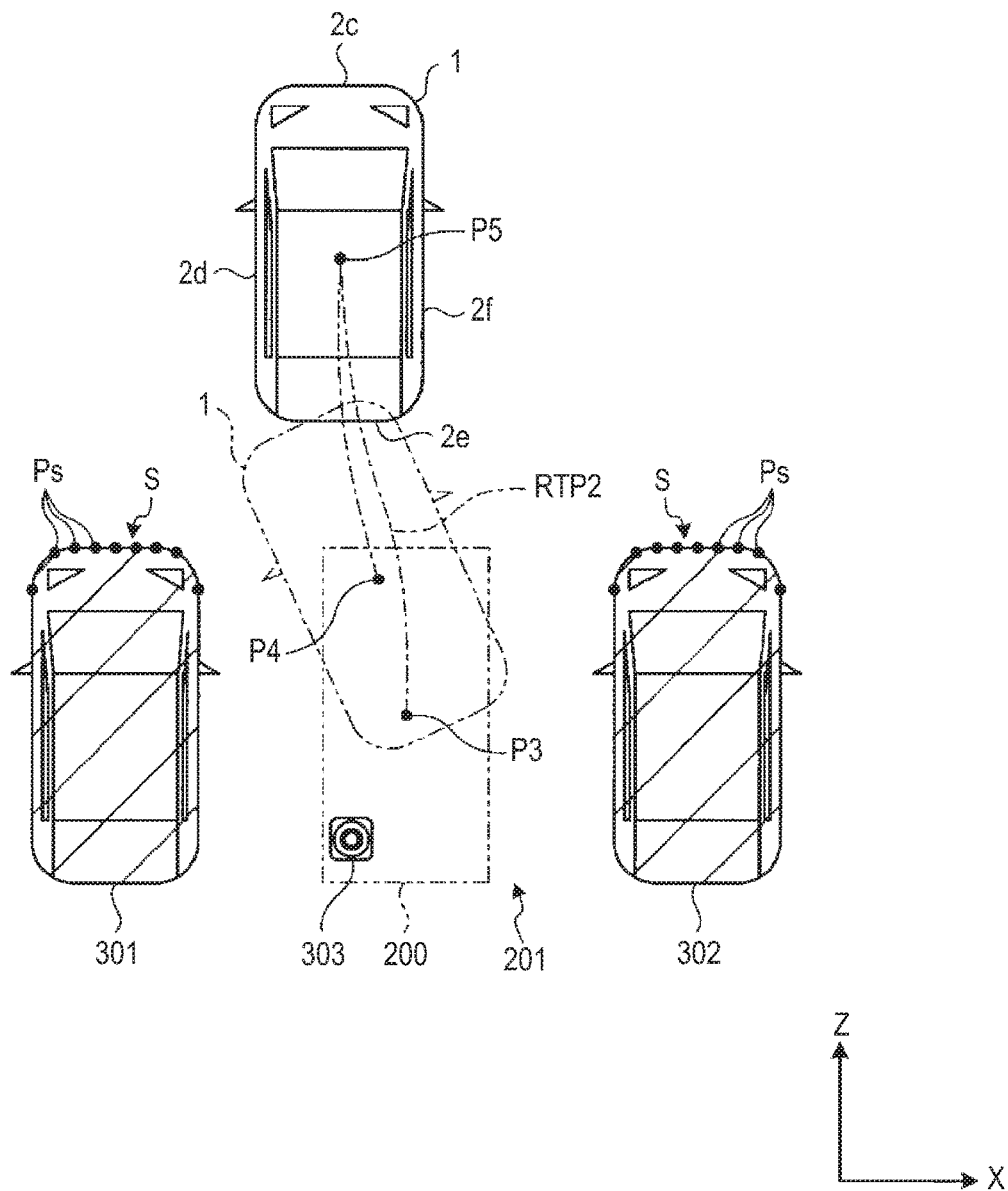
FIG. 12 is a plan view illustrating the recalculation of a route in the embodiment.

FIG. 12 is a plan view illustrating the recalculation of a route in the embodiment. As illustrated in FIG. 12, if the vehicle 1 is stopped, the ECU 14 serving as the movement route determination unit 144 recalculates and resets a movement route (S118). The movement route determination unit 144 calculates and resets a second movement route RTP2 to allow the vehicle 1 to move toward the target parking position P3 again via reverse turning of the steering wheel.

In the embodiment, the movement route determination unit 144 determines the second movement route RTP2 from a current position P4 of the vehicle 1 to the target parking position P3 via a reverse turning position P5 again. The position P4 is a position at which the ECU 14 serving as the detection unit 141 has detected the approach of the obstacle 303. In other words, the position P4 is a position at which the ECU 14 serving as the movement route determination unit 144 has set a reverse turning point to trace the second movement route RTP2. In FIG. 12, the vehicle 1 positioned at the position P4 is illustrated by an alternate one long and two short dashes line, and the vehicle 1 positioned at the reverse turning position P5 is illustrated by a solid line.

The second movement route RTP2 is formed such that the driver drives the vehicle 1 forward toward the reverse turning position P5 of the steering wheel (the steering section 4) while turning the steering wheel (the steering section 4) right, stops the vehicle 1 by pressing the brakes (the brake operation section 6) at the reverse turning position P5, changes a gear position to a reverse position (back), and gradually turns the steering wheel (the steering section 4) left toward the target parking position P3.

Figure 13:
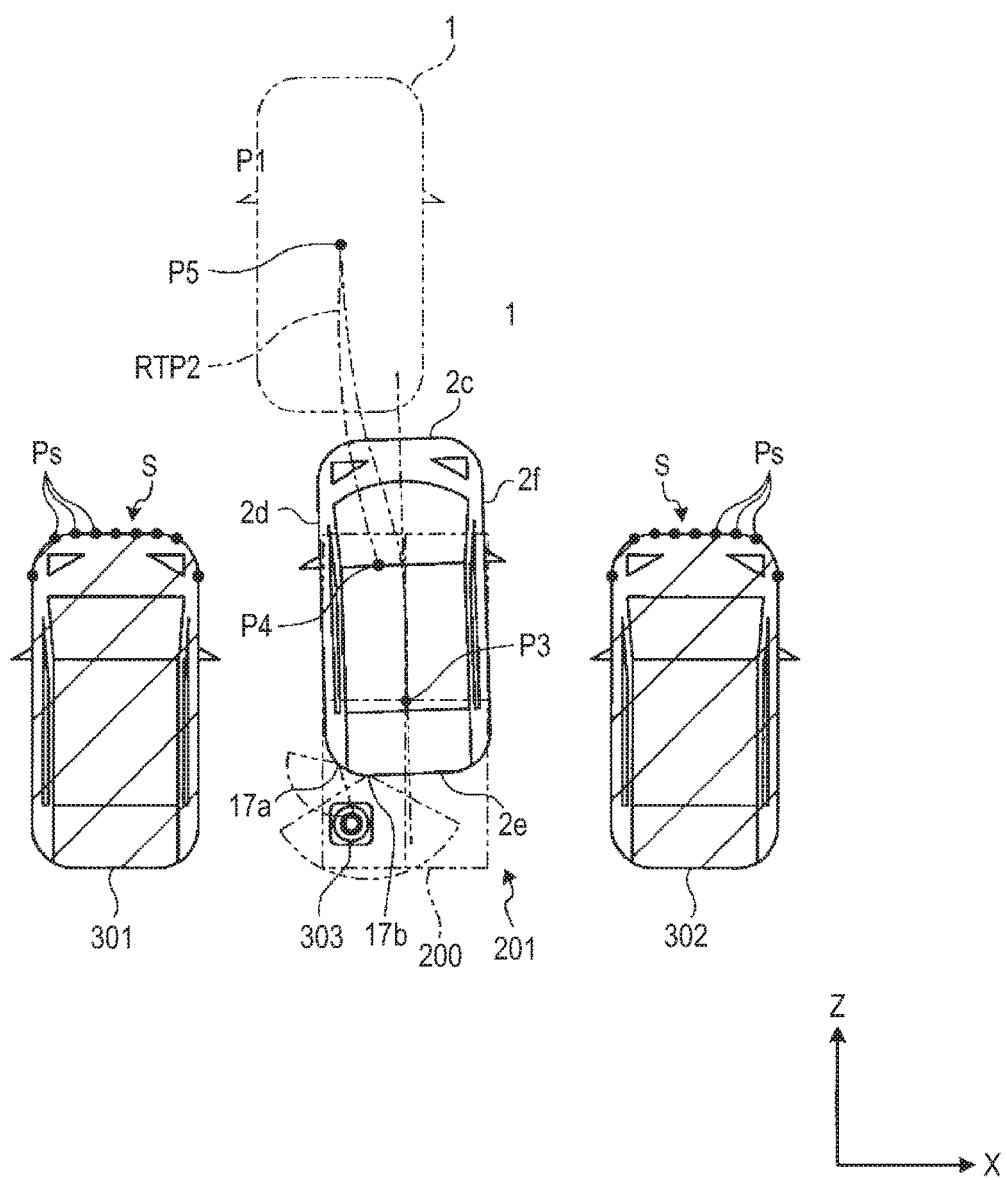
FIG. 13 is a plan view illustrating midway termination conditions in the embodiment.

FIG. 13 is a plan view illustrating midway termination conditions in the embodiment. The ECU 14 causes the process to transit to S112 again, and the vehicle 1 travels along the second movement route RTP2. If the vehicle 1 travels along the second movement route RTP2, as illustrated in FIG. 13, the obstacle 303 approaches the vehicle 1 again. In S211 illustrated in FIG. 11, the ECU 14 serving as the detection unit 141 detects the approach of the obstacle 303 (S211: Yes).

The X distance, the inclination angle θ, and the steering angle are corrected by reverse turning to trace the second movement route RTP2. For this reason, in an example illustrated in FIG. 13, the X distance, the inclination angle θ, and the steering angle are within the respective allowable ranges (S212: Yes, S213: Yes, and S214: Yes), and the advancing direction of the vehicle 1 in the Z direction is oriented toward the obstacle 303 (S215: Yes). In the example illustrated in FIG. 13, a portion of the vehicle 1 is present in the movement target area 200 (S216: Yes).

In contrast, in the example illustrated in FIG. 13, the Z distance is outside of the allowable range (S217: No). For this reason, the ECU 14 serving as the movement control unit 145 sets a flag to clear the midway termination conditions (S219).

Returning to FIG. 9, in a case where the midway termination conditions have been cleared in S117 (S117: Yes), the ECU 14 serves as the movement control unit 145 to cancel the automatic steering mode (S119), and to terminate the parking assistance.

As described above, when the approach of the obstacle 303 is detected while the vehicle 1 travels along the second movement route RTP2, if the position (X distance) of the vehicle 1 in the X direction is within the allowable range (S212: Yes), the inclination angle θ of the vehicle 1 is within the allowable range (S213: Yes), the steering angle of the vehicle 1 is within the allowable range (S214: Yes), the advancing direction of the vehicle 1 in the Z direction is oriented toward the movement target area 200 (S215: Yes), and at least a portion of the vehicle 1 is present in the movement target area 200 (S216: Yes), even if the position (Z distance) of the vehicle 1 in the Z direction is outside of the allowable range (S217: No), the ECU 14 serving as the movement control unit 145 terminates the parking assistance.

Figure 14:
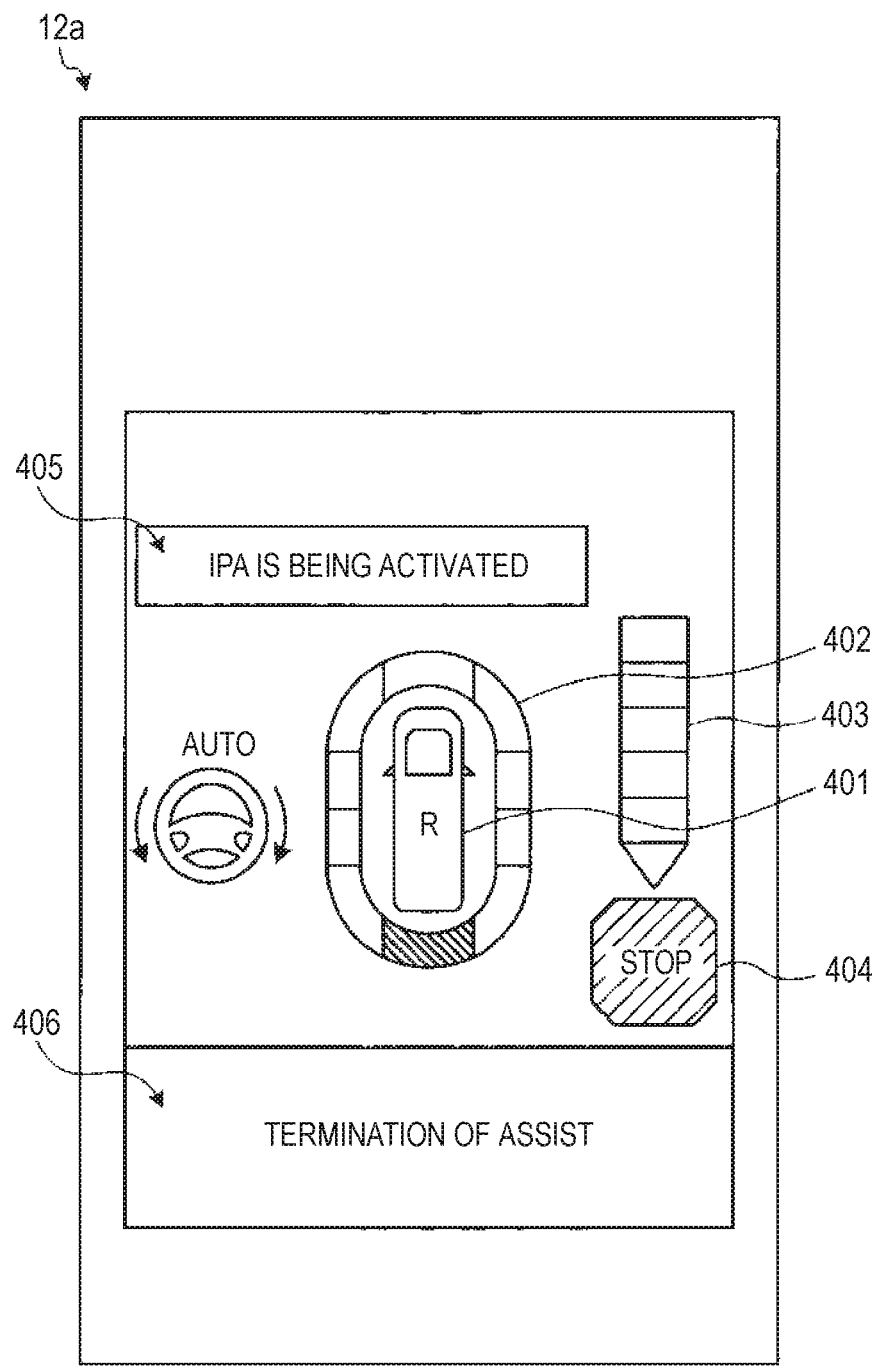
FIG. 14 is a view illustrating an example of a screen of a display device in the embodiment.

FIG. 14 is a view illustrating an example of the screen 12a of the display device 12 in the embodiment. The ECU 14 serves as the output information determination unit 146 to control the display device 12 such that during parking assistance (for example, in S114), the display device 12 displays images indicating information mainly regarding assisting the driver in parking the vehicle 1. The display device 12 is an example of a display section.

As illustrated in FIG. 14, the screen 12a displays a vehicle icon 401; an approach display icon 402; a distance display icon 403; a vehicle stop instruction icon 404; a state display window 405; and an instruction display window 406. The approach display icon 402 is an example of an image indicating the approach of an obstacle. Examples of an image in this specification include not only figures but also characters.

The vehicle icon 401 schematically illustrates the vehicle 1, and for example, illustrates the current position of the shift lever. The approach display icon 402 surrounds the vehicle icon 401, and is divided into a plurality of areas. The approach display icon 402 corresponds to the plurality of distance measuring units 16 and 17. If the distance measuring units 16 and 17 detect an obstacle, for example, areas of the approach display icon 402 which correspond to the distance measuring units 16 and 17 are turned on or off. As such, the approach display icon 402 illustrates the approach of the obstacle 303, and the approaching direction of the obstacle 303.

For example, the distance display icon 403 illustrates the distance to the target parking position P3. The vehicle stop icon 404 is turned on when the vehicle 1 is present at positions at which the vehicle 1 has to be stopped, in other words, the vehicle 1 is present at the reverse turning position P2 and the target parking position P3.

The state display window 405 displays a message indicating the state of the parking assistance system 100. In FIG. 14, the state display window 405 displays a message indicating that intelligent parking assist (IPA) is being activated.

The instruction display window 406 displays a message indicating an operation that has to be performed by the driver. In FIG. 14, the instruction display window 406 displays a message indicating that parking assistance is complete.

In the example illustrated in FIG. 13, the parking assistance is terminated in a state where one of the distance measuring units 17a and 17b has detected the approach of the obstacle 303. For this reason, as illustrated in FIG. 14, in a state where a portion (rear portion) of the approach display icon 402 which corresponds to the distance measuring units 17a and 17b is turned on or off, the parking assistance is terminated. As such, the output information determination unit 146 controls the display device 12 such that the screen 12a displays a message that parking assistance has been terminated due to the approach of the obstacle 303. The output information determination unit 146 may display a message, which indicates that parking assistance has been terminated due to the approach of the obstacle 303, on the screen 12a of the display device 12.

In a case where the obstacle 303 is not present in the movement target area 200, the vehicle 1 travels along a movement route (the first movement route RTP1 or the second movement route RTP2), and reaches the target parking position P3. In this case, the X distance, the inclination angle θ, the steering angle, and the Z distance are within the respective allowable ranges (S212: Yes, S213: Yes, S214: Yes, and S217: Yes), and the advancing direction of the vehicle 1 in the Z direction is oriented toward the obstacle 303 (S215: Yes). In addition, the vehicle 1 is present in the movement target area 200 (S216: Yes). For this reason, the ECU 14 serving as the movement control unit 145 sets a flag to clear the termination conditions (S218).

In a case where the termination conditions have been cleared in S116 (S116: Yes), the ECU 14 serves as the movement control unit 145 to cancel an automatic steering mode (S119), and to terminate the parking assistance.

As described above, in a case where the position of the vehicle 1 in the X direction is within the allowable range (S212: Yes), the inclination angle θ of the vehicle 1 is within the allowable range (S213: Yes), the steering angle of the vehicle 1 is within the allowable range (S214: Yes), the advancing direction of the vehicle 1 in the Z direction is oriented toward the movement target area 200 (S215: Yes), at least a portion of the vehicle 1 is present in the movement target area 200 (S216: Yes), and the position of the vehicle 1 in the Z direction is within the allowable range (S217: No), the ECU 14 serving as the movement control unit 145 terminates the parking assistance.

Figure 15:
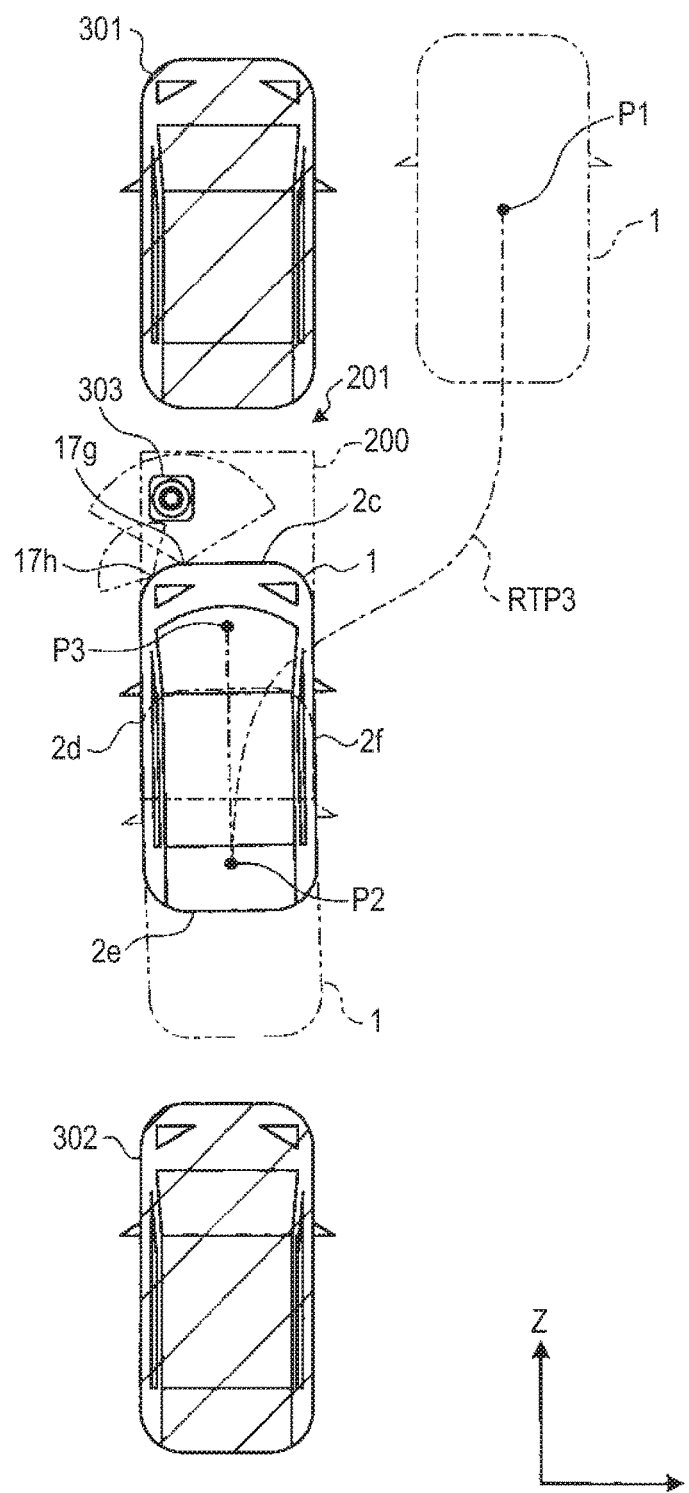
FIG. 15 is a plan view illustrating an example of parking assistance for parallel parking in the embodiment.

FIG. 15 is a plan view illustrating an example of parking assistance for parallel parking in the embodiment. As illustrated in FIG. 15, the aforementioned process is applied to not only double parking but also parallel parking.

In parallel parking illustrated in FIG. 15, the other vehicles 301 and 302 are parked in a line while being spaced away from each other in the Z direction. The obstacle 303 is present in the movement target area 200 positioned between the other vehicles 301 and 302. The obstacle 303 is positioned closer to the other vehicle 301 from the other vehicle 302. The obstacle 303 is positioned further away from the initial position P1 than the movement target position P3 in the X direction. The obstacle 303 may be present at another position.

Also, in perpendicular parking, the ECU 14 serves as the movement route determination unit 144 to determine a movement route of the vehicle 1 to the movement target area 200 in S14. As illustrated in FIG. 15, the movement route determination unit 144 determines a third movement route RTP3 from the initial position P1 when a parking assistance control process of the vehicle 1 is started, to the target parking position P3 via the reverse turning position P2. In FIG. 15, the vehicle 1 at the initial position P1 and the reverse turning position P2 is illustrated by an alternate one long and two short dashes line.

The third movement route RTP3 is formed such that a driver drives the vehicle 1 rearward while turning the steering wheel (the steering section 4) left by a predetermined amount, turns the steering wheel (the steering section 4) right by a predetermined amount toward the reverse turning position P2 of the steering wheel (the steering section 4), stops the vehicle 1 by pressing the brakes (the brake operation section 6) at the reverse turning position P2, changes a gear position to a forward movement (drive) position, and turns the steering wheel (the steering section 4) perfectly straight toward the target parking position P3. For example, the third movement route RTP3 is a route that contains an arc, a clothoid curve, and a straight line.

When the vehicle 1 moves from the reverse turning position P2 to the target parking position P3, the obstacle 303 reflects sound waves or the like which are emitted by one of the distance measuring units 17g and 17h disposed at the front end portion 2c of the vehicle 1. The distance measuring unit 17g or 17h calculates the distance to the obstacle 303 based on the sound waves or the like. The ECU 14 serving as the detection unit 141 detects the approach of the obstacle 303 based on the distance to the obstacle 303 detected by one of the distance measuring units 17g and 17h.

In an example illustrated in FIG. 15, when the approach of the obstacle 303 is detected while the vehicle 1 travels along the third movement route RTP3, the position (X distance) of the vehicle 1 in the X direction is within an allowable range (S212: Yes), the inclination angle θ of the vehicle 1 is within an allowable range (S213: Yes), the steering angle of the vehicle 1 is within an allowable range (S214: Yes), the advancing direction of the vehicle 1 in the Z direction is oriented toward the movement target area 200 (S215: Yes), and at least a portion of the vehicle 1 is present in the movement target area 200 (S216: Yes). For this reason, even if the position (Z distance) of the vehicle 1 in the Z direction is outside of an allowable range (S217: No), the ECU 14 serving as the movement control unit 145 cancels an automatic steering mode (S119), and terminates the parking assistance.

As described above, in a case where the midway termination conditions have been cleared (S117: Yes), the ECU 14 serving as the movement control unit 145 may terminate the parking assistance without reversely turning the steering wheel (without setting the second movement route RTP2). In a case where the termination conditions and the midway termination conditions have not been cleared (S116: No and S117: No), the ECU 14 serving as the movement control unit 145 may allow the steering wheel to be reversely turned two or more times.

During parking assistance, the obstacle 303 may be present in or in the vicinity of the movement target area 200. For example, in a case where the plurality of distance measuring units 16 and 17 have detected the obstacle 303 via triangulation, since the obstacle 303 is small or has a circular section, the obstacle 303 may be undetectable by two distance measuring units 16 and 17, but the obstacle 303 may be detectable by only one of the distance measuring units 16 and 17. In this case, the distance to the obstacle 303 can be detected; however, the position of the obstacle 303 may be undetectable. For this reason, there is a possibility that reverse turning of the steering wheel and the detection of the obstacle 303 are repeated without recalculation of the movement target area 200.

If the position (X distance) of the vehicle 1 in the rightward and leftward direction (X direction) of the movement target area 200 is within the allowable range, and the inclination angle θ of the vehicle 1 relative to the movement target area 200 is within the allowable range, even if the position (Z distance) of the vehicle 1 in the forward and rearward direction (Z direction) of the movement target area 200 is outside of the allowable range, when the detection unit 141 detects the approach of the obstacle 303, the movement control unit 145 in the embodiment terminates the assist. Accordingly, even if the obstacle 303 is present, and it is difficult to specify the position of the obstacle 303 in the forward and rearward direction of the vehicle 1, it is possible to prevent the occurrence of repeated adjustment (turning reversely) of the position in the forward and rearward direction. In other words, it is possible to terminate the parking assistance in a situation where the termination of the parking assistance is acceptable.

In a case where in addition to the aforementioned conditions, a condition that the advancing direction of the vehicle 1 in the forward and rearward direction (Z direction) of the movement target area 200 is oriented toward the movement target area 200 is satisfied, the movement control unit 145 terminates the assist. Accordingly, the unintended termination of the parking assistance is prevented from occurring when the vehicle 1 travels away from the movement target area 200.

In a case where in addition to the aforementioned conditions, a condition that the steering angle is within the allowable range is satisfied, the movement control unit 145 terminates the assist. Accordingly, the movement control unit 145 is capable of terminating the assist in a state where the steering angle is set such that the vehicle 1 is aligned substantially in the forward and rearward direction.

The detection unit 141 detects the approach of the obstacle 303 in a case where the distance to the obstacle 303, which has been detected by the distance measuring unit 17a provided at a corner of the vehicle 1, is less than the first threshold value, or in a case where the distance to the obstacle 303, which has been detected by the distance measuring unit 17b provided at the end portion 2e of the vehicle 1 in the forward and rearward direction, is less than the second threshold value which is greater than the first threshold value. Accordingly, the unintended termination of the parking assistance, which is not caused by the detection of the approach of the obstacle 303 but by the detection of the approach of the other adjacent vehicle 301 via the distance measuring unit 17a, is prevented.

In a case where in addition to the aforementioned conditions, a condition that at least a portion of the vehicle 1 is present in the movement target area 200 is satisfied, the movement control unit 145 terminates the assist. Accordingly, the unintended termination of the parking assistance is prevented from occurring when the vehicle 1 is present outside of the movement target area 200.

The output information determination unit 146 controls the display device 12 such that the display device 12 displays the approach display icon 402 illustrating the approach of the obstacle 303. Accordingly, the driver can recognize that the parking assistance is terminated due to the approach of the obstacle 303.

In the aforementioned embodiment, the obstacle 303 is a road cone; however, an obstacle is not limited to a road cone. For example, also, in a case where an obstacle such as a wall, a curb, or a buffer stop is present in or in the vicinity of the movement target area 200, the parking assistance system 100 in the embodiment prevents the occurrence of repetition of the adjustment (turning reversely) of the position in the forward and rearward direction.

According to at least the one aforementioned embodiment, in a case where, while a vehicle travels along a route, the position of the vehicle in a rightward and leftward direction of a target area is within a first range, an inclination angle of the vehicle relative to the target area is within a second range, the position of the vehicle in a forward and rearward direction of the target area is within a third range, and an obstacle detection unit has detected the approach of an obstacle, a movement control unit terminates assist. Accordingly, the occurrence of repetition of reverse turning is prevented.

The embodiment disclosed here does not limit the scope of this disclosure, and is merely an example included in the scope of this disclosure. An embodiment of this disclosure may be configured by making modifications, omissions, and additions to at least a portion of the specific usage, structures, shapes, actions, and effects of the aforementioned embodiment insofar as the modifications, omissions, and additions do not depart from the concept of this disclosure.

A parking assistance device according to an aspect of this disclosure includes: an obstacle detection unit; a target determination unit; a route determination unit; and a movement control unit. The obstacle detection unit detects an obstacle. The target determination unit determines a target area. The route determination unit determines a route from a position of a vehicle to the target area when assisting a driver in parking the vehicle in the target area. The movement control unit assists the driver in parking the vehicle in the target area by detecting the position and an inclination angle of the vehicle and controlling the vehicle, terminates the assist in a case where the position of the vehicle in a rightward and leftward direction of the target area is within a first range, the inclination angle of the vehicle relative to the target area is within a second range, and the position of the vehicle in a forward and rearward direction of the target area is within a third range, and also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, and the obstacle detection unit has detected the approach of an obstacle. In this configuration, even if an obstacle is present, and it is difficult to specify the position of the obstacle in the forward and rearward direction of the vehicle, it is possible to prevent the occurrence of repeated adjustment (turning reversely) of the position in the forward and rearward direction.

In the parking assistance device according to the aspect of this disclosure, the movement control unit may also terminate the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, an advancing direction of the vehicle in the forward and rearward direction of the target area is oriented toward the target area, and the obstacle detection unit has detected the approach of an obstacle. In this configuration, the unintended termination of the parking assistance is prevented from occurring when the vehicle travels away from the target area.

In the parking assistance device according to the aspect of this disclosure, the movement control unit may terminate the assist in a case where the position of the vehicle in the rightward and leftward direction of the target area is within the first range, the inclination angle of the vehicle relative to the target area is within the second range, the position of the vehicle in the forward and rearward direction of the target area is within the third range, and the steering angle of the vehicle is within a fourth range, and the movement control unit also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, the steering angle of the vehicle is within the fourth range, and the obstacle detection unit has detected the approach of an obstacle. In this configuration, the movement control unit is capable of terminating the assist in a state where the steering angle is set such that the vehicle is aligned substantially in the forward and rearward direction.

In the parking assistance device according to the aspect of this disclosure, the obstacle detection unit may detect the approach of the obstacle via a first distance measuring unit that is provided at a corner of the vehicle and detects the distance to the obstacle, and via a second distance measuring unit that is provided at an end portion of the vehicle in a forward and rearward direction of the vehicle and detects the distance to the obstacle, and the obstacle detection unit may detect the approach of the obstacle in a case where the distance to the obstacle detected by the first distance measuring unit is less than a first threshold value, or in a case where the distance to the obstacle detected by the second distance measuring unit is less than a second threshold value which is greater than the first threshold value. In this configuration, the unintended termination of the parking assist, which is not caused by the detection of the approach of an obstacle but by the detection of the approach of an adjacent vehicle via the first distance measuring unit, is prevented.

In the parking assistance device according to the aspect of this disclosure, the movement control unit may also terminate the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, at least a portion of the vehicle is present in the target area, and the obstacle detection unit has detected the approach of an obstacle. In this configuration, the unintended termination of the parking assistance is prevented from occurring when the vehicle is present outside of the target area.

The parking assistance device according to the aspect of this disclosure may further include an output information determination unit which controls a display section such that the display section displays an image indicating the approach of the obstacle. In this configuration, the driver can recognize that the parking assistance is terminated due to the approach of an obstacle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
at least one processor configured as:
an obstacle detection unit that detects an obstacle;
a target determination unit that determines a target area;
a route determination unit that determines a route from a position of a vehicle to the target area when assisting a driver in parking the vehicle in the target area; and
a movement control unit that assists the driver in parking the vehicle in the target area by detecting the position and an inclination angle of the vehicle and controlling the vehicle, terminates an assist, that includes automatic control of a forward or rearward drive force of the vehicle for parking the vehicle, in a case where the position of the vehicle in a rightward and leftward direction of the target area is within a first range, the inclination angle of the vehicle relative to the target area is within a second range, the position of the vehicle in a forward and rearward direction of the target area is within a third range, and the steering angle of the vehicle is within a fourth range, and also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, the steering angle of the vehicle is within the fourth range, and the obstacle detection unit has detected an approach of an obstacle.

2. The parking assistance device according to claim 1, wherein the movement control unit also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, an advancing direction of the vehicle in the forward and rearward direction of the target area is oriented toward the target area, and the obstacle detection unit has detected the approach of an obstacle.

3. The parking assistance device according to claim 1, wherein the obstacle detection unit detects the approach of the obstacle via a first distance measuring unit that is provided at a corner of the vehicle and detects a distance to the obstacle, and via a second distance measuring unit that is provided at an end portion of the vehicle in a forward and rearward direction of the vehicle and detects the distance to the obstacle, and wherein the obstacle detection unit detects the approach of the obstacle in a case where the distance to the obstacle detected by the first distance measuring unit is less than a first threshold value, or in a case where the distance to the obstacle detected by the second distance measuring unit is less than a second threshold value which is greater than the first threshold value.

4. The parking assistance device according to claim 1, wherein the movement control unit also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, at least a portion of the vehicle is present in the target area, and the obstacle detection unit has detected the approach of an obstacle.

5. The parking assistance device according to claim 1, wherein
the at least one processor is further configured as an output information determination unit which controls a display section such that the display section displays an image indicating the approach of the obstacle.

6. The parking assistance device according to claim 1, wherein the movement control unit terminates the assist in a case where the position of the vehicle in the rightward and leftward direction of the target area is within the first range, the inclination angle of the vehicle relative to the target area is within the second range, the position of the vehicle in the forward and rearward direction of the target area is within the third range, and the steering angle of the vehicle is within the fourth range, and the movement control unit also terminates the assist in a case where, while the vehicle travels along the route, the position of the vehicle in the rightward and leftward direction of the target area is within the first range, the inclination angle of the vehicle relative to the target area is within the second range, the position of the vehicle in the forward and rearward direction of the target area is outside of the third range, the steering angle of the vehicle is within the fourth range, and the obstacle detection unit has detected the approach of an obstacle, the obstacle being in the target area.

7. The parking assistance device according to claim 6, wherein
the obstacle in the target area is not detected in the target area by the obstacle detection unit until after the automatic control of the forward or rearward drive force of the vehicle for parking the vehicle is started.

* * * * *